US012717740B2

(12) United States Patent
Brueggen

(10) Patent No.: US 12,717,740 B2
(45) Date of Patent: Aug. 25, 2026

(54) MULTI-TRAFFIC-CLASS TRACKER ARBITRATION WITH FOCUS AND PRIORITIZED DEALLOCATION

(71) Applicant: Hewlett Packard Enterprise Development LP, Spring, TX (US)

(72) Inventor: Christopher M. Brueggen, Allen, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 68 days.

(21) Appl. No.: 18/970,308

(22) Filed: Dec. 5, 2024

(65) Prior Publication Data

US 2026/0161583 A1 Jun. 11, 2026

(51) Int. Cl.
*G06F 13/28* (2006.01)

(52) U.S. Cl.
CPC ...... *G06F 13/28* (2013.01); *G06F 2213/2802* (2013.01)

(58) Field of Classification Search
CPC ......................... G06F 13/28; G06F 2213/2802
USPC ............................................................ 710/1
See application file for complete search history.

(56) References Cited

U.S. PATENT DOCUMENTS 9,762,502 B1 * 9/2017 Mogul ................ H04L 47/2441
9,959,227 B1 * 5/2018 Diamant ................. G06F 13/28
10,853,308 B1 * 12/2020 Subramanian .... G06F 15/17331
12,250,163 B2 * 3/2025 Kasichainula ...... H04L 12/4641
12,561,261 B1 * 2/2026 Brueggen ............. G06F 9/3814
2006/0288129 A1 * 12/2006 Pope ....................... G06F 13/28 710/22
2008/0172499 A1 * 7/2008 Moriki .................... G06F 13/36 710/22
2021/0014177 A1 * 1/2021 Kasichainula ........ H04L 49/901
2023/0396555 A1 * 12/2023 Kasichainula ...... H04L 47/6275
2024/0256477 A1 * 8/2024 Li ........................... G06F 13/28

* cited by examiner

*Primary Examiner* — Christopher B Shin

(74) *Attorney, Agent, or Firm* — Yao Legal Services, Inc.

(57) ABSTRACT

A direct memory access (DMA) engine receives an instruction corresponding to a packet of a message and indicating a traffic class identifier (ID). The engine stores an entry for the instruction in a tracker, a respective tracker entry comprising a traffic class ID and indicators of whether the respective entry requires processing, a transfer of a DMA payload is complete, and is actively transferring the DMA payload. The engine arbitrates among the entries, by: determining a current mask indicating entries currently excluded selection; updating the current mask in cycles in response to detecting remaining tracker entries which require processing, have sufficient available output queue credit for the traffic class ID, and are not currently masked; and identifying the winning tracker entry based on the current mask and the indicators for the entries. The system forwards information associated with the winning tracker entry in response to meeting a priority level.

20 Claims, 9 Drawing Sheets

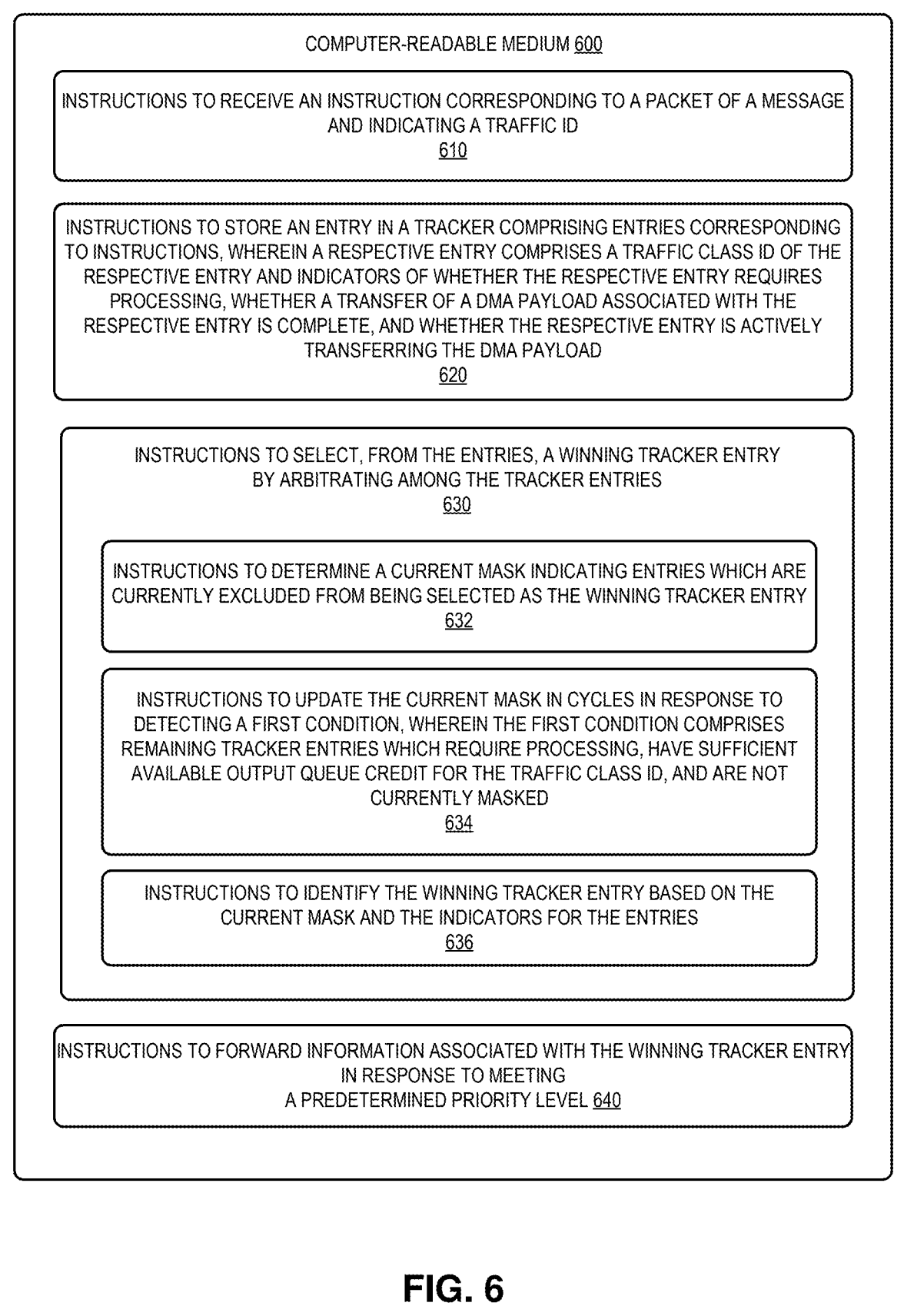

COMPUTER-READABLE MEDIUM 600

INSTRUCTIONS TO RECEIVE AN INSTRUCTION CORRESPONDING TO A PACKET OF A MESSAGE AND INDICATING A TRAFFIC ID
610

INSTRUCTIONS TO STORE AN ENTRY IN A TRACKER COMPRISING ENTRIES CORRESPONDING TO INSTRUCTIONS, WHEREIN A RESPECTIVE ENTRY COMPRISES A TRAFFIC CLASS ID OF THE RESPECTIVE ENTRY AND INDICATORS OF WHETHER THE RESPECTIVE ENTRY REQUIRES PROCESSING, WHETHER A TRANSFER OF A DMA PAYLOAD ASSOCIATED WITH THE RESPECTIVE ENTRY IS COMPLETE, AND WHETHER THE RESPECTIVE ENTRY IS ACTIVELY TRANSFERRING THE DMA PAYLOAD
620

INSTRUCTIONS TO SELECT, FROM THE ENTRIES, A WINNING TRACKER ENTRY BY ARBITRATING AMONG THE TRACKER ENTRIES
630

INSTRUCTIONS TO DETERMINE A CURRENT MASK INDICATING ENTRIES WHICH ARE CURRENTLY EXCLUDED FROM BEING SELECTED AS THE WINNING TRACKER ENTRY
632

INSTRUCTIONS TO UPDATE THE CURRENT MASK IN CYCLES IN RESPONSE TO DETECTING A FIRST CONDITION, WHEREIN THE FIRST CONDITION COMPRISES REMAINING TRACKER ENTRIES WHICH REQUIRE PROCESSING, HAVE SUFFICIENT AVAILABLE OUTPUT QUEUE CREDIT FOR THE TRAFFIC CLASS ID, AND ARE NOT CURRENTLY MASKED
634

INSTRUCTIONS TO IDENTIFY THE WINNING TRACKER ENTRY BASED ON THE CURRENT MASK AND THE INDICATORS FOR THE ENTRIES
636

INSTRUCTIONS TO FORWARD INFORMATION ASSOCIATED WITH THE WINNING TRACKER ENTRY IN RESPONSE TO MEETING A PREDETERMINED PRIORITY LEVEL 640

FIG. 6

MULTI-TRAFFIC-CLASS TRACKER ARBITRATION WITH FOCUS AND PRIORITIZED DEALLOCATION

BACKGROUND

Field

A network interface card (NIC) can incorporate a direct memory access (DMA) engine, and the DMA engine may include a multi-entry tracker which can manage parallel processing of enhanced DMA operations (e.g., "scatter/gather" operations). The DMA engine may process instructions by creating tracker entries and each instruction may be associated with a traffic class. A tracker arbitrator may arbitrate among the tracker entries based on two goals: traffic class independence, in which each traffic class has a guaranteed minimal throughput independent of other traffic classes; and balanced priority for each traffic class, in which traffic classes with more tracker entries may receive more priority than traffic classes with fewer tracker entries. One current arbitration scheme is a two-level scheme which first arbitrates among entries in each traffic class and then arbitrates among the traffic classes. While this scheme satisfies traffic class independence, it does not always achieve balanced priority. Another arbitration scheme is a flat round-robin scheme, which achieves balanced priority but does not ensure traffic class independence.

BRIEF DESCRIPTION OF THE FIGURES

FIG. 6 illustrates a computer-readable medium which facilitates multi-traffic-class tracker arbitration with focus and prioritized deallocation, in accordance with an aspect of the present application.

In the figures, like reference numerals refer to the same figure elements.

DETAILED DESCRIPTION

Figure 1A:
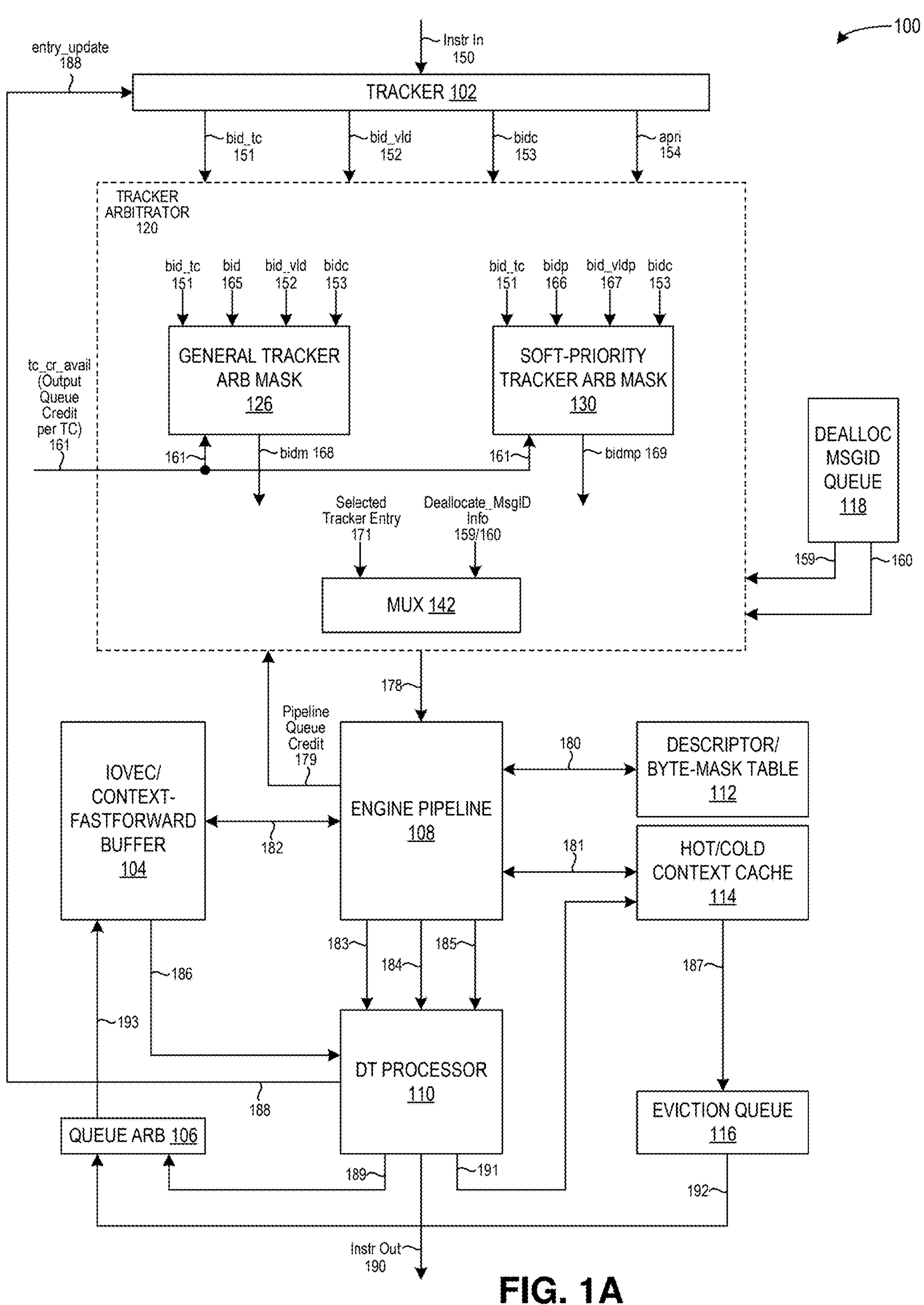
FIG. 1A illustrates a diagram of an architecture which facilitates multi-traffic-class tracker arbitration with focus and prioritized deallocation, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

The described aspects provide a hybrid arbitration scheme for selecting tracker entries for processing in a DMA engine. The hybrid scheme may achieve both traffic class independence and balanced priority.

A DMA engine in a NIC may be used to accelerate the transfer of "message" payload from and to a host memory, e.g., to generate a series of basic DMA instructions that describe individual reads from or writes to host memory. A "message" may be a piece of information transferred across the network as one or more packets (e.g., Ethernet frames with Transfer Control Protocol/Internet Protocol (TCP/IP) packets, a proprietary transport packet, etc.).

The DMA engine may include a multi-entry tracker (e.g., a 256-entry tracker) which can manage parallel processing of enhanced DMA operations. The DMA engine may process DMA instructions by creating tracker entries and each instruction may be associated with a traffic class. A tracker arbitrator may arbitrate among the tracker entries based on two goals: traffic class independence, in which each traffic class has a guaranteed minimal throughput independent of other traffic classes; and balanced priority for each traffic class, in which traffic classes with more tracker entries may receive more priority than traffic classes with fewer tracker entries. One current arbitration scheme is a two-level scheme which first arbitrates among tracker entries in each traffic class and then arbitrates among the traffic classes. While this scheme satisfies traffic class independence, it does not achieve balanced priority. Another arbitration scheme is a flat round-robin scheme, which achieves balanced priority but does not ensure traffic class independence.

The described aspects provide a hybrid arbitration scheme which can achieve both of the goals of traffic class independence and balanced priority by using a tracker and a tracker arbitrator in a DMA engine which handles incoming instructions. A large message may be transferred across the network as a series of packets, with each packet corresponding to and requiring its own high-level DMA operation. Each packet of a message may correspond to an input DMA instruction which may be received by the DMA engine, and each input DMA instruction may require multiple rounds of processing by the DMA engine. A round of processing generally involves issuing output instructions which define lower-level DMA operations to be performed. A round of processing may include one or more of: issuing read(s) to fetch input/output vector (IOVEC) entries or starting context from host memory; issuing read(s) or write(s) of DMA payload; transferring final context of a DMA operation to a tracker entry processing a following same-message operation; storing final context in a cache for final disposal; and downgrading context from a hot context cache to a cold context cache or evicting the context (e.g., freeing associated resources).

Each DMA instruction can carry a traffic class encoding (e.g., a traffic class identifier (ID)), and each traffic class can have a dedicated output queue with associated output queue credit. Output instructions belonging to a particular traffic class can be placed into the corresponding traffic class-specific output queue only if that output queue has sufficient available output queue credit. The tracker in the DMA engine can allocate a tracker entry for each incoming DMA instruction, and a tracker arbitrator can select a winning tracker entry by arbitrating among the tracker entries based on the operations described herein. As described below in relation to FIG. 1A, a single processing pipeline can be fed by the tracker. As a result, the arbitration among the tracker entries by the arbitrator can provide multi-traffic-class, time-sliced access to the processing pipeline.

In addition to the traffic class ID, each DMA instruction can carry a message identifier ("message ID" or "MsgID") which associates instructions of a same overall message with each other. Based on the MsgID, the tracker can create a linked-list of tracker entries managing same-message instructions, which allows the instructions to be processed in order. The DMA engine can use the MsgID (along with the packet offset) to transfer context from one instruction to a following instruction of the same message. In some instances, the DMA engine may cache the context when a following instruction has not yet arrived to claim the context. When the message is complete (as evaluated and determined at a higher level by a component external to the DMA engine), the DMA engine may receive a "Deallocate_MsgID" command, which can carry the MsgID of the message which has completed.

Upon receiving the Deallocate_MsgID command, the DMA engine can perform operations to ensure that the MsgID may be reused. For example, for a given MsgID included in a Deallocate_MsgID command, any active tracker entries which contain the given MsgID must complete processing and go idle. Since the message was determined to be complete, it may be assumed that such a tracker entry will already have completed the payload transfer process. However, while that tracker entry may have completed the payload transfer process, the tracker entry may still be actively processing a pre-fetch of IOVEC entries. This process may be internal to the DMA engine and thus not visible to components outside of the DMA engine. When a tracker entry in such a "external operations complete but internal operations pending" state receives a Deallocate_MsgID command, the DMA engine may mark that tracker entry with a state bit indicating that the given MsgID has been deallocated. Setting this state bit can allow the DMA engine to complete its internal operations (e.g., collect the remaining IOVEC entry fetches) but refrain from performing any other operations (e.g., caching context).

In addition to marking the state bit of the "internal operations pending" tracker entries when receiving the Deallocate_MsgID command, the DMA engine can also deallocate resources associated with the given MsgID, e.g., by removing or evicting, from the cold context cache, any context associated with the given MsgID and freeing other resources associated with the MsgID.

The tracker arbitrator can produce qualified bit vectors based on various inputs, including whether tracker entries have not yet started or already completed DMA payload transfer (which are processed by a general tracker arbitration mask unit) and whether tracker entries are actively transferring DMA payload (which are processed by a "soft-priority" tracker arbitration mask unit), as described below in relation to FIGS. 1B and 2. The arbitrator can select a winning tracker entry by maintaining a current "progressive" mask which indicates entries currently excluded from being selected as the winning entry. The arbitrator can also update the current mask progressively in a hybrid manner which incorporates a round-robin-like technique while using additional logic based on the traffic class to ensure traffic class independence. For example, if no tracker entries in a given traffic class require processing and no tracker entries in the given tracker class are unmasked, the arbitrator can clear the bits in the progressive mask which correspond to tracker entries of that given tracker class, as described below in relation to FIGS. 2, 4A, and 4B.

The tracker arbitrator can also apply an order of priority to tracker entries, where: tracker entries which have already completed DMA payload transfer have the highest priority for being processed with final context disposed of (forwarded, cold-cached, or evicted); a Deallocate_MsgID command has the next highest priority for processing; and all other tracker entries have the lowest priority for being processed.

For example, the tracker arbitrator may apply a highest level of priority for selection (e.g., to be processed and forwarded) to tracker entries which have already completed the DMA payload transfer and completed all IOVEC entry pre-fetches, if applicable (referred to as tracker entries in the "BIDC" state). For tracker entries in the BIDC state, all processing associated with that tracker entry has already occurred, which places that tracker entry in the BIDC state. Tracker entries in the BIDC state may be left with a remaining final context, which must be disposed of, e.g., by: transferring the final context to a same-message following instruction; stored in a cold context cache; or evicted from a hot or cold context cache, via the processing pipeline, as described below in relation to FIG. 1A. When the tracker arbitrator selects the tracker entry in the BIDC state as the winning tracker entry and the remaining context is handled, the tracker can place that tracker entry into an idle state making it available for reallocation.

The tracker arbitrator may apply a next level of priority for processing a Deallocate_MsgID command. The DMA engine may receive a Deallocate_MsgID command which can be queued in a Deallocate_MsgID queue. Upon winning arbitration, the command may travel through the engine pipeline and attempt to flush context from the context cache. However, some tracker entries associated with that MsgID may be in the BIDC state and still waiting to send or store their final context in the context cache for final disposal. If the Deallocate_MsgID command is processed prior to the BIDC tracker entry storing its final context in the cache (i.e., if that BIDC tracker entry wins arbitration after or at a lower priority level than the Deallocate_MsgID command), that BIDC tracker entry may store more context in the cold cache associated with the MsgID processed in the Deallocate MsgID command. This may result in unnecessarily storing the final context for that BIDC tracker entry without any subsequent expectation or possibility of deleting that context based on the corresponding and already processed Deallocate_MsgID command.

The described arbitrator addresses this potential inefficiency when selecting inputs to process by placing BIDC tracker entries at the highest priority and at a higher priority over the Deallocate MsgID command. In addition, the arbitrator may place the Deallocate MsgID command at a higher priority level than all other tracker entries. Enforcing this priority is described below in relation to the multiplexer and NOR component of FIG. 1.

Thus, the described aspects can support multiple rounds of processing per DMA instruction to achieve the first goal of traffic class independence by progressively updating the mask in a round-robin-like manner which also accounts for the traffic class, as described below in relation to FIG. 2. The described aspects can also achieve the second goal of balanced priority by providing a highest-level priority to tracker entries which have already completed DMA payload transfer (e.g., in the BIDC state), a second-level priority to Deallocate_MsgID commands, and a third-level priority to all other entries, including a "soft priority" (as described herein) to tracker entries that are in the process of actively transferring DMA. The first and second-level priorities are absolute, meaning: 1) If there are any tracker entries in the BIDC state, no other tracker entries or Deallocate_MsgID commands can win arbitration; and 2) If no tracker entries are in the BIDC state and a Deallocate_MsgID command is queued, the Deallocate_MsgID command will win arbitration. The third-level priority may include a "soft-priority": if no tracker entries are in the BIDC state and no Deallocate_MsgID commands are queued, all tracker entries that require processing are eligible to win arbitration, but tracker entries marked for "soft-priority" (i.e., tracker entries that are actively transferring DMA payload) will win arbitration more frequently than others.

FIG. 1A illustrates a diagram 100 of an architecture which facilitates multi-traffic-class tracker arbitration with focus and prioritized deallocation, in accordance with an aspect of the present application. Diagram 100 depicts a DMA engine 100 (also referred to as the "engine") and includes various components external to the engine. Engine 100 may be part of circuitry or logic in a NIC which can perform the operations described herein. Engine 100 may include: a tracker 102 which maintains a, e.g., 256-entry data structure; a tracker arbitrator 120 which handles scheduling of tracker entries for the processing of incoming instructions to the engine; a DMA engine pipeline 108 (also referred to as the "engine pipeline") which gathers information from various units or components in and external to the engine; an IOVEC/context-FastForward ("context-FF") buffer 104 (ICB) which stores data fetched from host memory; a descriptor/byte-mask table 112 with entries which define a scatter/gather operation, including both non-byte-mask descriptor storage and byte-mask descriptor storage; a hot/cold context cache 114 which caches contexts based on an associated access or storage time; a datatype processor (DTP) 110 which receives inputs (e.g., from engine pipeline 108) and sends output indicating, e.g., DMA instructions; an eviction queue 116 which stores contexts from hot/cold context cache 114 which are to be processed as part of eviction from the cache; and a queue arbitrator 106 which handles scheduling for processing of data output from DTP 110 and eviction queue 116.

During operation, engine 100 can receive an instruction 150 which may include information defining a scatter/gather operation at a high level, e.g.: a base host memory address; an overall payload length; and a reference to an entry in descriptor table 112. For each input instruction, engine 100 may ultimately produce multiple instruction outputs, which each describes a single DMA read or write. Engine 100 may also produce DMA read instructions to fetch data from host memory on its own behalf, e.g., fetching data to be stored in ICB 104.

Upon receiving instruction 150, tracker 102 can allocate a tracker entry and store information from the instruction in the tracker entry along with initial high-level processing state. Tracker 102 may track received instructions, and each entry (e.g., of 256 entries) of the tracker can manage the overall scatter/gather operation corresponding to the instruction. Tracker arbitrator 120 may schedule the instruction for processing by performing various operations based on inputs from tracker 102 (e.g., inputs 151, 152, 153, and 154, described below), a credit-based flow control associated with output queues per traffic class of the engine (e.g., input 161), and a command to deallocate resources associated with a message ID (e.g., inputs 159 and 160). Based on the inputs, tracker arbitrator 120 may arbitrate among the tracker entries to select a winning tracker entry to be processed and may output information associated with the winning tracker entry (via a communication 178). The operations of tracker arbitrator 120 may allow engine 100 to manage many concurrent gather/scatter operations in a time-sliced manner. The details of tracker arbitrator 120 are described below in relation to FIG. 1B A round of processing may begin with a tracker entry being selected (i.e., winning arbitration). Engine pipeline 108 may obtain the number of the winning tracker entry along with the looked-up instruction from the corresponding tracker entry (via communication 178). Engine pipeline may also gather information from other components in engine 100. For example, based on a descriptor reference provided in the instruction, engine pipeline 108 may obtain: the descriptor from descriptor table 112 (via a communication 180). Based on the tracker entry number or MsgID value the engine pipeline may obtain the current context, if available, from hot/cold context cache 114 (via a communication 181). Based on information in the context, the engine pipeline may obtain data (e.g., IOVEC entries or context-FF data), if available, from ICB 104 (via a communication 182).

Engine pipeline 108 may include a number of pipeline queues used to accumulate the gathered information. A tracker entry cannot win arbitration unless sufficient space is available in these pipeline queues. Engine pipeline 108 can send the Pipeline Queue Credit (via a communication 179) as an input to tracker arbitrator 120 (to be used as described below in relation to FIG. 1B).

Engine pipeline 108 may send the gathered information as inputs to DTP 110 (via, e.g., communications 183, 184, and 185). DTP 110 may process the information received over one or more cycles and may generate and send as outputs: a tracker state update to tracker 112 (via a communication 188, e.g., an entry_update 188); information to be sent to ICB 104 via queue arbitrator 106 (via a communication 189; the new (hot) context to hot/cold context cache 114 (via a communication 191); and DMA read/write instructions to be processed and transmitted by components external to engine 100 (via a communication 190). Cache 114 may send data to be evicted from its storage to eviction queue 116 (via a communication 187), and eviction queue 116 may store and send contexts to be processed for eviction to queue arbitrator 106 (via a communication 192). Queue arbitrator 106 may handle scheduling for processing of data output from DTP 110 (received via communication 189) and eviction queue 116 (received via communication 192). Based on the scheduling, queue arbitrator 106 may send information to be stored in or a command to remove information from ICB 104 (via a communication 193).

Table 1 below provides descriptions for variables used in the operation of tracker arbitrator 120, including inputs, outputs, and intermediate values used within tracker arbitrator 120:

TABLE 1

| VARIABLE | DESCRIPTION |
|---|---|
| bid_vld | One bit per entry indicating whether the respective tracker entry requires processing |
| bid_tc | The traffic class encoding per entry (e.g., the traffic class ID) |
| bidc | One bit per entry indicating whether the respective tracker entry is in the "BIDC" state (i.e., transfer of DMA payload associated with the respective entry is complete) |
| apri | One bit per entry indicating whether the respective tracker entry is actively transferring the DMA payload |
| entry_dealloc | Indicates that a tracker entry is being deallocated (along with the tracker entry number) |
| Pipeline Queue Credit | Indicates the amount of space or credit available in pipeline queues used to accumulate various information from table/buffer/cache reads |
| tc_cr_avail (Output Queue Credit per TC) | Indicates the amount of space or credit available in output queues per traffic class ID; the DMA engine produces output instructions and places them in independent traffic-class-specific output queues; sufficient output queue credit for a given traffic class must be available for a tracker entry with an instruction in that particular traffic class to win arbitration |
| Deallocate_ MsgID/MsgID | A command to deallocate resources associated with an indicated MsgID along with with an indication that the command is valid (e.g., an output from the Deallocate_MsgID queue which also indicates that the queue is not empty) |
| miq_empty | Indicates that the Deallocate_MsgID queue is empty |
| any_bidc | Indicates whether any tracker entries are in the BIDC state |
| bid_rdy | Indicates tracker entries which may be processed as all its necessary resources are available (e.g., Pipeline Queue Credit and Output Queue Credit); if any bidc bit is set, then bid_rdy only indicates readiness for tracker entries in the "BIDC" state; otherwise, if the Deallocate_MsgID queue is not empty, then bid_rdy is zero. |
| bid | Indicates tracker entries which require processing and have the necessary resources for processing; result of AND of bid_vld and bid_rdy |
| bid_vldp | Indicates tracker entries which are ready to be processed and are actively processing DMA payload; result of AND of bid_vld and apri |
| bidp | Indicates a "soft-priority" version of tracker entries which require processing, have the necessary resources for processing, and are actively transferring DMA payload; result of an AND of bid and apri |
| bidm | A bit vector which is a version of bid with a portion masked off; output of General Tracker Arb Mask |
| bidmp | A bit vector which is a version of bidp with a portion masked off; output of Soft-Priority Tracker Arb Mask |
| bidmm | Result of 50/50 arbitration or selection of bidm and bidmp |
| entry_lookup | The looked-up instruction from the tracker based on the winning tracker entry number after performing Find_First on bidmm |

Engine 100 in FIG. 1A depicts tracker arbitrator 120 at a high level. Tracker arbitrator 120 can include multiple components, including at least: a General tracker arbitrator mask ("Trk_Arb_Msk") 126; a Soft-Priority tracker arbitrator mask ("Trk_Arb_Msk") 130; and a multiplexer ("mux") 142. As noted above, tracker arbitrator 120 may receive at least six inputs: a bid_tc vector 151; a bid_vld vector 152; a bidc vector 153; an apri vector 154; a tr_cr_avail value (indicating Output Queue Credit per traffic class (TC)) 161; and a command 159 or information 160 associated with a command to deallocate resources associated with a message ID. Some of these inputs may be processed with other information (not shown in FIG. 1A; as described below in relation to FIG. 1B) in order to obtain the inputs to General Trk_Arb_Msk 126 and Soft-Priority Trk_Arb_Msk 130. For example, General Trk_Arb_Msk 126 may take as input bid_tc 151, bid 165, bid_vld 152, bidc 153, and tr_cr_avail and may generate or output a bidm 168, which is a version of the bid vector with a portion masked off (as described below in relation to FIG. 2). Similarly, Soft-Priority Trk_Arb_Msk 130 may take as input bid_tc 151, bidp 166, bid_vldp 167, bidc 153, and tr_cr_avail and may generate or output a bidmp 169, which is a version of the bidp vector with a portion masked off (as described below in relation to FIG. 2).

Mux 142 may receive as input a selected tracker entry 171 based on operations performed on vectors bidm 168 and bidmp 169 (as described below in relation to FIG. 1B). Mux 142 may also receive as input information associated with a command to deallocate resources associated with a message ID (indicated as Deallocate_MsgID information 159/160, e.g., a command 159 or an indicator 160 of whether Deallocate_MsgID queue 118 is empty). Mux 142 may select an input based on a predetermined priority level, e.g.: tracker entries which have already completed DMA payload transfer have the highest priority for being processed and forwarded; a Deallocate_MsgID command has the next highest priority for processing; and all other tracker entries have the lowest priority for being processed and forwarded. The selection of inputs by mux 142 is described further below in relation to FIG. 1B.

Figure 1B:
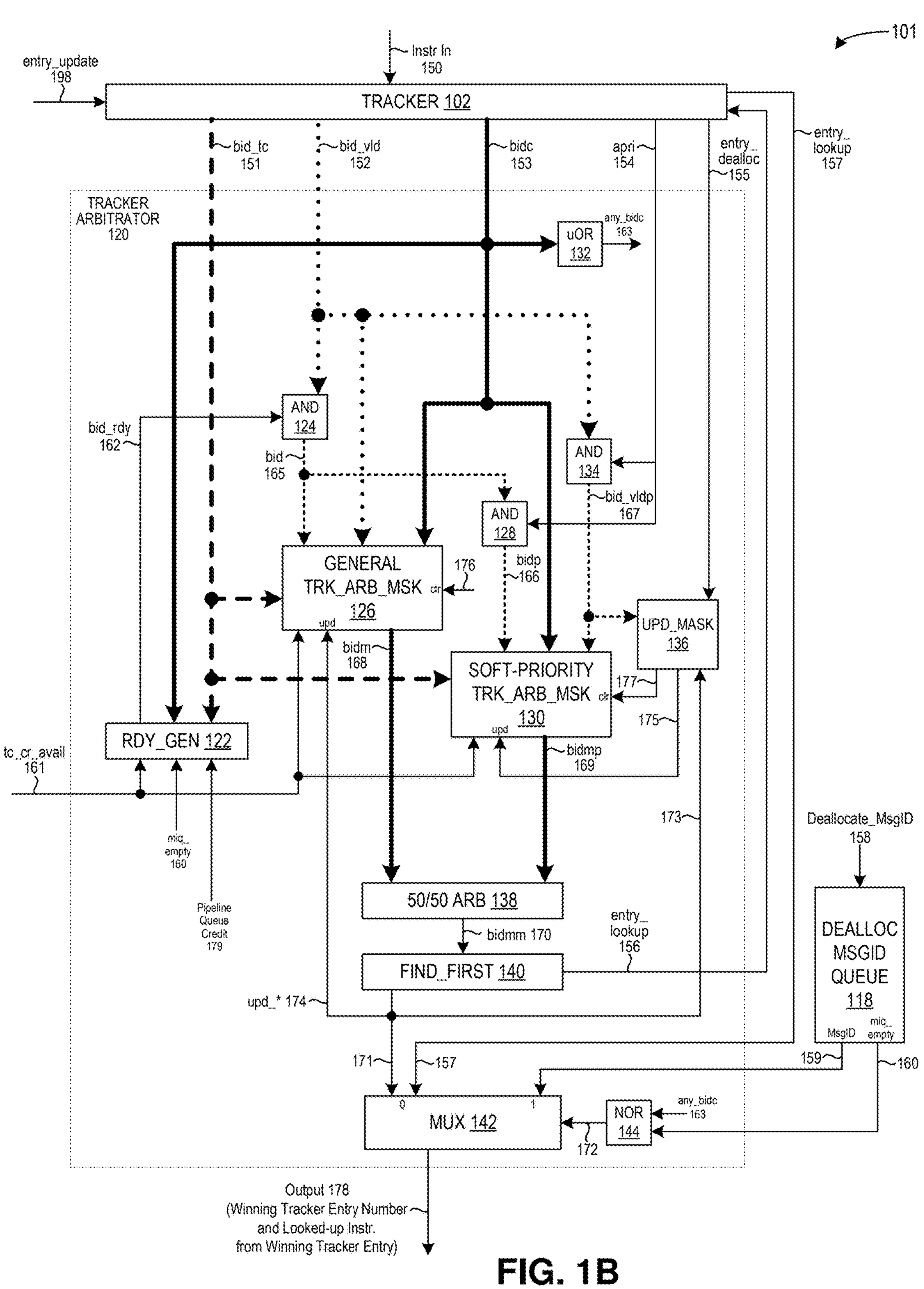
FIG. 1B illustrates a zoomed-in diagram of a portion of the architecture in FIG. 1A, in accordance with an aspect of the present application.

FIG. 1B illustrates a detailed diagram 101 of a portion of the architecture in FIG. 1A, in accordance with an aspect of the present application. Diagram 101 depicts tracker 102, tracker arbitrator 120, and Deallocate_MsgID queue 118. Tracker arbitrator 120 may receive inputs from tracker 102, including: bid_tc vector 151; bid_vld vector 152; bidc vector 153; apri vector 154; an entry_dealloc 155; and the result 157 of an entry_lookup request 156. The flow of bid_tc vector 151 can be indicated by a bold dashed line pattern; the flow of bid_vld vector 152 can be indicated by a bold dotted line pattern; the flow of bidc vector 153 can be indicated by a bold solid line pattern; and the flow of apri vector 154 (and other flows) can be indicated by a non-bold solid line pattern.

In addition, tracker arbitrator 120 may receive, from components external to the engine: a tr_cr_avail value (indicating Output Queue Credit per traffic class) 161; Pipeline Queue Credit 179; and a Deallocate_MsgID command 159 or an indicator 160 of whether Deallocate_MsgID queue 118 is empty.

Tracker arbitrator 120 can produce several qualified bit vectors. A Rdy_Gen block 122 may take as input: tr_cr_avail 161 (indicating an Output Queue Credit per traffic class);

miq_empty 160 (indicating whether the Deallocate_MsgID queue is empty); Pipeline Queue Credit 179; bid_tc 151; and bidc 153. Based on these inputs, Rdy_Gen block 122 may produce a bid_rdy vector 162, which indicates tracker entries which may be processed as all its necessary resources are available (including Output Queue Credit 161 and Pipeline Queue Credit 179). If any bidc 153 bit is set, then bid_rdy only indicates readiness for tracker entries in the BIDC state. Otherwise, if the Deallocate_MsgID queue 118 is not empty (e.g., miq_empty indicates a value of 1), then bid_rdy can be set to zero, which enforces the priority levels described herein.

An AND block 124 can produce a bid vector 165 based on an AND of bid_rdy 162 and bid_vld 152, where bid 165 indicates tracker entries which require processing and have the necessary resources for processing. An AND block 128 can produce a bidp vector 166 based on an AND of bid 165 and apri 154, where bidp 165 indicates a soft-priority version of tracker entries which require processing, have the necessary resources for processing, and are actively transferring DMA payload. An AND block 134 can produce a bid_vldp vector 167 based on an AND of bid_vld 152 and apri 154, where bid_vldp vector 167 indicates tracker entries which are ready to be processed and are actively processing DMA payload. Based on bidc vector 153, an unary OR ("uOR") block 132 can produce an indicator any_bidc 163 of whether any tracker entries are in the BIDC state.

Subsequently, two versions of Trk_Arb_Msk may be used to generate masked bid vectors to be used to identify a winning tracker entry. General Trk_Arb_Msk 126 may take as input bid_tc 151, bid 165, bid_vld 152, bidc 153, and tr_cr_avail 161 and may generate or output bidm vector 168, which is a version of the bid vector (e.g., bid 165) with a portion masked off (as described below in relation to FIG. 2). Similarly, Soft-Priority Trk_Arb_Msk 130 may take as input bid_tc 151, bidp 166, bid_vldp 167, bidc 153, and tr_cr_avail 161 and may generate or output a bidmp 169, which is a version of the bidp vector (e.g., bidp 166) with a portion masked off (as described below in relation to FIG. 2).

A 50/50 arbitrator 138 may take as input bidm 168 and bidmp 169 and select one of the vectors based on a simple 50/50 arbitration scheme. For example, 50/50 arbitrator 138 may select between two bit-per-tracker-entry vectors such that the result may be input into a priority-multiplexer circuit which can perform both the priority encode and the tracker entry lookup in parallel. The resulting vector selected by 50/50 arbitrator 138 may be referred to as bidmm 170. A Find_First block 140 may perform a priority encode on bidmm vector 170 in order to identify the lowest-numbered tracker entry as the current winning tracker entry. In some aspects, Find_First block 140 may perform a separate priority encode on each of bidm 168 and bidmp 169 to obtain two Find_First results, and 50/50 arbitrator 138 may select between the two Find_First results.

Find_First block 140 may send the number of the winning tracker entry to mux 142 (via a communication 171). Find_First block 140 may also send an entry_lookup request 156 to tracker 102, and the corresponding entry_lookup 157 (e.g., the lookup-up instruction from tracker 102) may be returned as an input to mux 142 (via a communication 157). Find_First block 140 may also send other information to an update mask ("Upd_Mask") block 136 (via a communication 173).

In addition to receiving the other information via communication 173 from Find_First block 140, Upd_Mask block 136 may also take as input bid_vldp 167 and entry_dealloc 155. Upd_Mask block 136 may send information related to updating the current mask to Soft-Priority Trk_Arb_Msk 130 (as upd_* 175). The values for upd_* may indicate: whether the mask needs to be updated; the winning tracker entry in the current cycle; the traffic class ID of the winning tracker entry; and a state of the winning tracker entry (as described below in relation to FIG. 2). In addition, Upd_Mask block 136 may send a signal to clear the entire updated mask, e.g., a "clr" signal 177 to Soft-Priority Trk_Arb_Msk 130. The "clr" input (176) to General Trk_Arb_Msk 126 is unused and tied to "0."

A NOT OR ("NOR") 144 block may take as input any_bidc 163 and indicator miq_empty 160. NOR 144 determines if there are no tracker entries in the BIDC state and if the miq_empty indicates that Deallocate_MsgID Queue 118 is not empty. If this is true, the result is transmitted to mux 142 (via a communication 172) and indicates to mux 142 to process Deallocate_MsgID command 159. The logic of NOR 144 provides an example of implementing and enforcing the priority levels for processing BIDC tracker entries, Deallocate_MsgID commands, and other tracker entries. That is, based on NOR 144, mux 142 may select an input based on a predetermined priority level, e.g.: tracker entries which have already completed DMA payload transfer have the highest priority for being processed and forwarded; a Deallocate_MsgID command has the next highest priority for processing; and all other tracker entries have the lowest priority for being processed and forwarded.

Finally, after mux 142 performs its selection, mux 142 can provide a final output 178 from tracker arbitrator 120. Final output 178 may include the winning tracker entry number and the looked-up instruction corresponding to the winning tracker entry.

Figure 2:
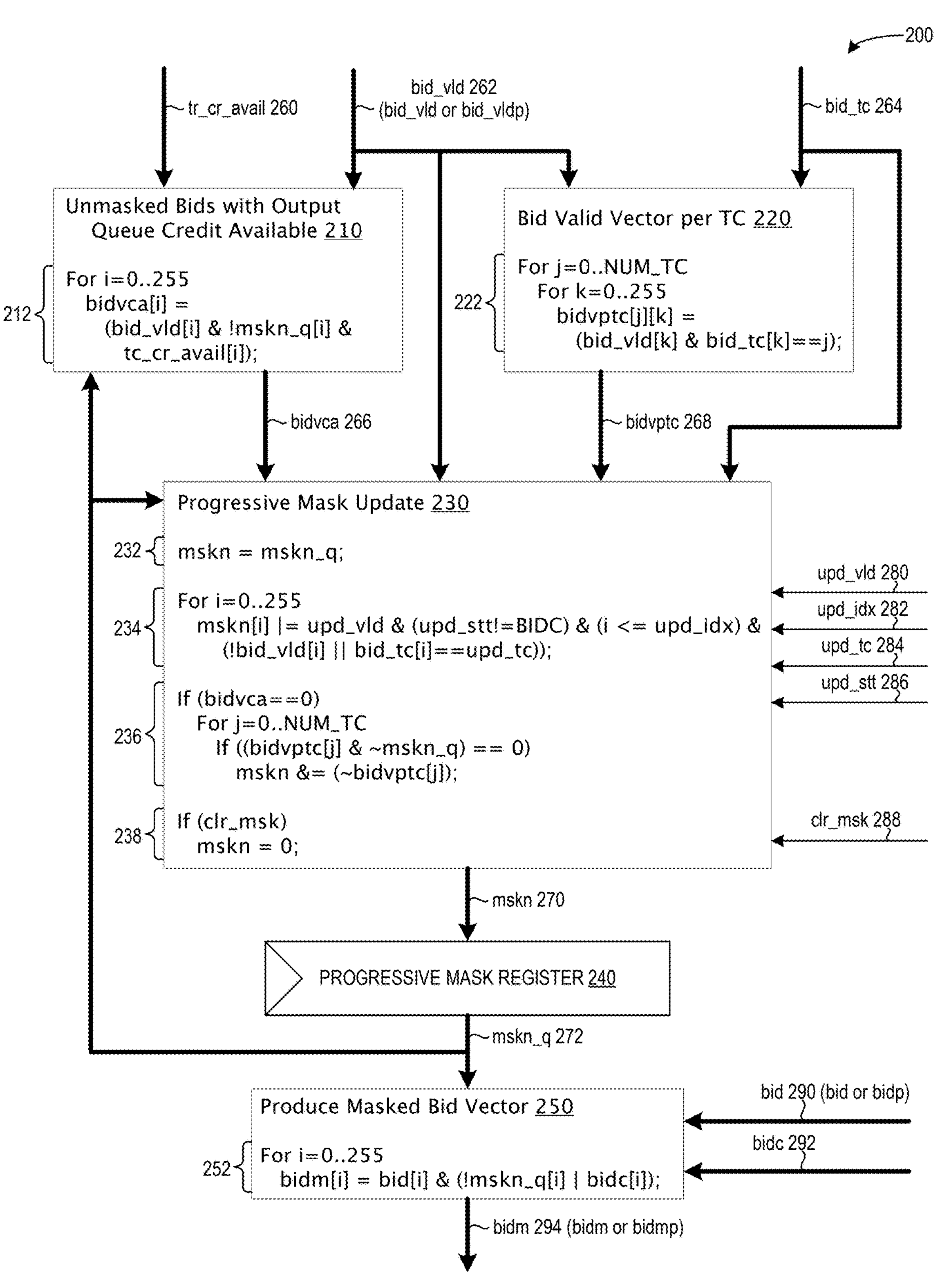
FIG. 2 depicts a diagram of a tracker bid mask unit, including updating a progressive mask and producing a masked bid vector, in accordance with an aspect of the present application.

FIG. 2 depicts a diagram 200 of a tracker bid mask unit (i.e., Trk_Arb_Msk), including updating a progressive mask and producing a masked bid vector, in accordance with an aspect of the present application.

Table 2 below provides descriptions for variables used in the operation of General Trk_Arb_Msk 126 and Soft-Priority Trk_Arb_Msk 130, including inputs, outputs, and intermediate values:

TABLE 2

| VARIABLE | DESCRIPTION |
|---|---|
| tc_cr_avail (Output Queue Credit per TC) | Indicates the amount of space or credit available in output queues per traffic class ID; the DMA engine produces output instructions and places them in independent traffic-class-specific output queues; sufficient output queue credit for a given traffic class must be available for a tracker entry with an instruction in that particular traffic to win arbitration |
| bid_vld | One bit per entry indicating whether the respective tracker entry requires processing; this value is bid_vld or bid_vldp depending on the instance of the Tracker Mask Arb. |
| bid_tc | The traffic class encoding per entry (e.g., the traffic class ID) |
| bid | Indicates tracker entries which require processing and have the necessary resources for |

TABLE 2-continued

| VARIABLE | DESCRIPTION |
|---|---|
| | processing; result of AND of bid_vld and bid_rdy; this value is bid or bid_p depending on the instance of the Tracker Mask Arb |
| bidc | One bit per entry indicating whether the respective tracker entry is in the "BIDC" state (i.e., transfer of DMA payload associated with the respective entry is complete |
| bidvca | Result of psuedocode for identifying unmasked bids with available Output Queue Credit (i.e., indicates qualified tracker entries which require processing, have available Output Queue Credit, and are not currently masked) |
| bidvptc | Result of psuedocode for identifying bid valid vector per traffic class (i.e., a 2D array with vectors per traffic class, where each traffic-class-specific vector indicates tracker entries belonging to that traffic class which require processing) |
| mskn | Indicates the updated progressive mask; is set to the current progressive mask per cycle |
| mskn_q | Indicates the current mask; is used as the initial or starting updated mask in the next cycle |
| bidm | A bit vector which is a version of bid or bidp (depending on the instance of the Trk_Arb_Msk) with a portion masked off; output of Trk_Arb_Msk |
| upd_vld | Indicates that the progressive mask should be updated |
| upd_idx | Indicates a tracker entry which has won arbitration in the current cycle (e.g., the winning tracker entry number) |
| upd_tc | Indicates the traffic class of a tracker entry which has won arbitration |
| upd_stt | Indicates the state (e.g., BIDC or other) of a tracker entry which has won arbitration |
| clr_msk | Received from an entity external to the DMA engine and may be used to forcibly (and completely) clear the progressive mask |

The tracker bid mask unit depicted in diagram 200 may represent both instances of General Trk_Arb_Msk 126 and Soft-Priority Trk_Arb_Msk 130. The difference is in the use of the bid and bid_vld inputs, as described below. The tracker bid mask unit can receive as input: tr_cr_avail 260 (similar to tr_cr_avail 161 of FIGS. 1A and 1B); bid_vld 262 (which may be either bid_vld or bid_vldp depending on the Trk_Arb_Msk instance, e.g., similar to bid_vld 152 and bid_vldp 167 of FIGS. 1A and 1B); bid_tc 264 (similar to bid_tc 151 of FIGS. 1A and 1B); bid 290 (which may be either bid or bidp depending on the Trk_Arb_Msk instance, e.g., similar to bid 165 and bidp 166 of FIGS. 1A and 1B); and bidc 292 (similar to bidc 153 of FIGS. 1A and 1B). In addition, the tracker bid mask unit can receive as input several upd_* values, including: upd_vld 280; upd_idx 282; upd_tc 284; and upd_stt 286 (similar to upd_* values 174 and 175 of FIG. 1B). The tracker bid mask unit can also receive as input a clr_msk 288 signal to clear the entire updated mask (similar to "clr" signal 176 received as input to General Trk_Arb_Msk 126 and a "clr" signal 177 received as input to Soft-Priority Trk_Arb_Msk 130 in FIG. 1B).

The tracker bid mask unit may first determine unmasked bids with output queue credit available based on inputs tr_cr_avail 260, bid_vld 262, and current mask mskn_q 272 (as indicated by pseudocode (PC) 212 in element 210). The result of PC 212 can be a bit vector bidvca 266, which indicates qualified tracker entries which require processing, have sufficient available output queue credit, and are not currently masked. PC 212 is reproduced below:

```
212 { For i= 0..255
        bidvca[i] =
          (bid_vld[i]) & !mskn_q[i] &
            tc_cr_avail[i]);
```

The tracker bid mask unit may also determine a bid valid vector for each traffic class based on inputs bid_vld 262 and bid_tc 264 (as indicated by PC 222 in element 220). The result of PC 222 can be a two-dimensional array of traffic-class-specific vectors, bidvptc 268, where a respective traffic-class-specific vector indicates tracker entries of the respective traffic class which require processing. PC 222 is reproduced below:

```
222 { For j= 0..NUM_TC
        For k= 0..255
          bidvptc[i][k] =
            (bid_vld[k]) & bid_tc[k]= =j);
```

Next, the tracker bid mask unit may determine the updated mask (i.e., update the progressive mask) based on inputs bidvca 266, bidvptc 268, bid_vld 262, bid_tc 264, current mask mskn_q 272, upd_* values 280-286, and clr_msk signal 288 (as indicated by pseudocode 232, 234, 236, and 238 in element 230). PC 232-238 is reproduced below:

```
232 { mskn = mskn_q;

234 { For i=0..255
        mskn[i] |=upd_vld & (upd_stt != BIDC) & (i <= upd_idx) &
          (! bid_vld[i] || b id_tc[i]= =upd_tc));

236 { If (bidvca= =0)
        For j = 0..NUM_TC
          If ((bidvptc[j] & ~ mskn_q)= =0)
            mskn &=(~bidvptc[j]);

238 { If (clr_msk)
        mskn = 0;
```

The tracker bid mask unit may set the updated mask mskn_q to the current mask mskn (if any) (as indicated by pseudocode 232). The tracker bid mask unit may update the mask in a respective cycle for a respective bit of the mask responsive to determining that a condition is satisfied (as indicated by pseudocode 234). This condition may include: determining that an update to the current mask is required based on the winning tracker entry being selected; determining that the transfer of the DMA payload associated with the winning tracker entry is not complete; determining that a position of a respective bit in the mask is less than or equal to a position or number associated with the winning tracker entry; and determining that at least one of the position of the respective bit in the mask corresponding to a tracker entry indicates a same traffic class ID as a traffic class ID of the winning tracker entry and the position of the respective bit in the mask corresponds to a tracker entry which does not currently require processing.

The tracker bid mask unit may subsequently determine whether any or all bits of the mask should be cleared. If there are no tracker entries in a respective traffic class which requires processing and is not masked, the tracker bid mask unit can partially clear the mask by clearing any bits corresponding to tracker entries associated with the respective traffic class (as indicated by pseudocode 236). In some aspects, if the tracker bid mask unit receives a command or signal to clear the entire mask, the tracker bid mask unit may clear the entire mask (as indicated by pseudocode 238).

The tracker bid mask unit may store the updated mask mskn 270 in progressive mask register 240, where mskn 270 may be used as the current mask mskn_q 272 in a next cycle.

Subsequently, the tracker bid mask unit may produce the masked bid vector based on inputs bid 290, bidc 292, and the current mask mskn_q 272 (as indicated by PC 252 in element 250). PC 252 is reproduced below:

$$252\left\{\begin{array}{l}\text{For } i = 0..255 \\ \quad bidm[i] = \text{bid}[i] \;\; \& \; (!\ \text{mskn\_q}[i] | bidc[i]);\end{array}\right.$$

The result of PC 252 can be a bidm vector 294 which indicates tracker entries which require processing and may be processed and are either: (i) not currently masked; or (ii) in the BIDC state. The resulting bidm vector 294 may be either bidm or bidmp depending on the Trk_Arb_Msk instance (e.g., similar to bidm 168 and bidmp 169 of FIGS. 1A and 1B). The bidm vector 294 may be sent as input to and received by 50/50 arbitrator 138 for subsequent processing, as described above in relation to FIG. 1B.

Figure 3A:
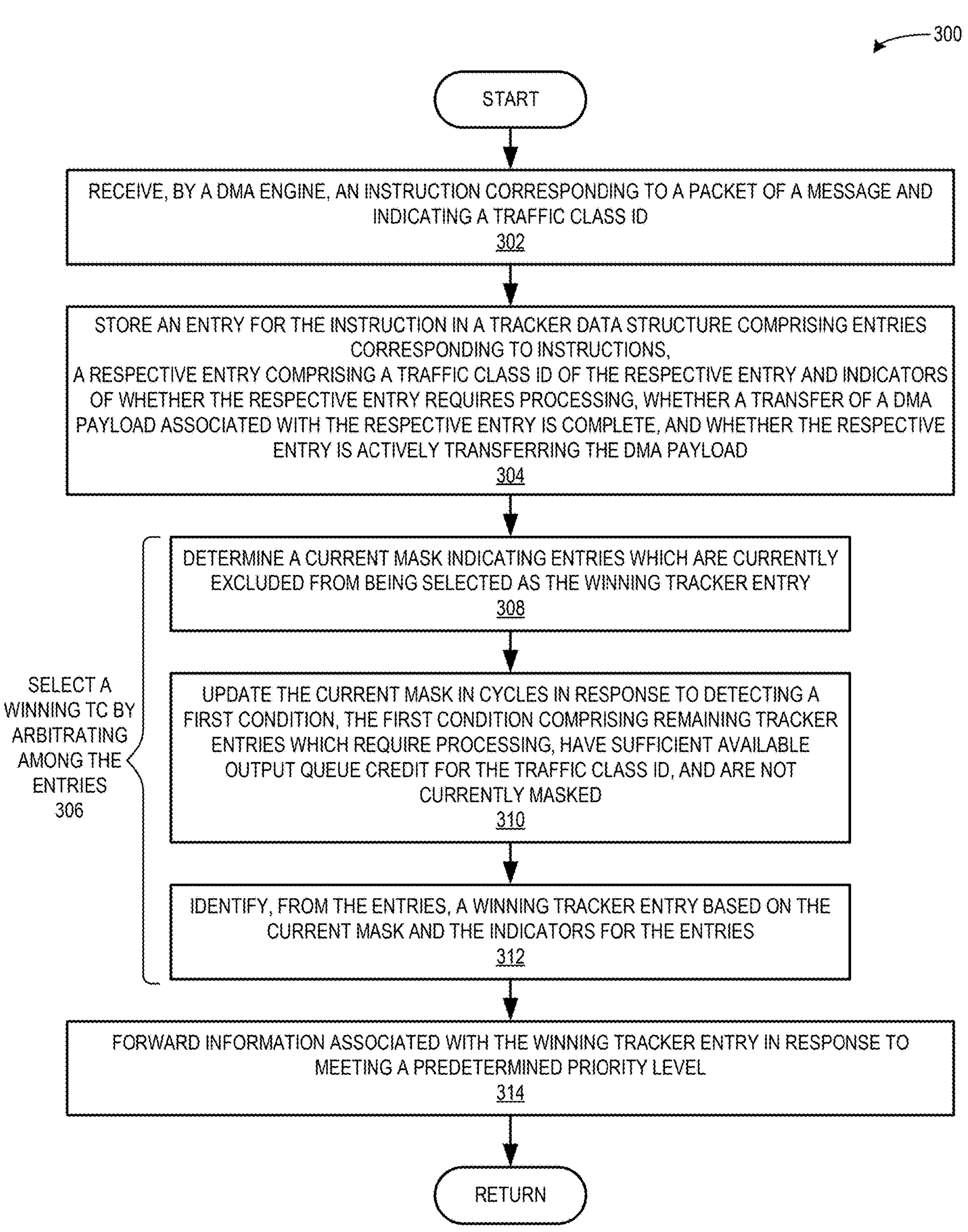
FIG. 3A presents a flowchart illustrating a method which facilitates multi-traffic-class tracker arbitration with focus and prioritized deallocation, in accordance with an aspect of the present application.

FIG. 3A presents a flowchart 300 illustrating a method which facilitates multi-traffic-class tracker arbitration with focus and prioritized deallocation, in accordance with an aspect of the present application. During operation, the system receives, by a direct memory access (DMA) engine, an instruction corresponding to a packet of a message and indicating a traffic class identifier (ID) (operation 302). For example engine 100 can receive an instruction 150 which corresponds to a packet of a message and indicates a traffic class ID, as described above in relation to FIGS. 1A and 1B.

The system stores an entry for the instruction in a tracker data structure comprising entries corresponding to instructions, a respective entry comprising a traffic class ID of the respective entry and indicators of whether the respective entry requires processing, whether a transfer of a DMA payload associated with the respective entry is complete, and whether the respective entry is actively transferring the DMA payload (operation 304). The tracker data structure may hold, e.g., 256 entries. As described above in relation to FIGS. 1A and 1B, the bid_tc vector 151 may include the traffic class encoding (e.g., the traffic class ID) per entry. The bid_vld vector 152 may include one bit per entry indicating whether the respective tracker entry requires processing. The bidc 153 vector may include one bit per entry indicating whether the respective tracker entry is in the BIDC state (i.e., transfer of the DMA payload associated with the respective entry is complete). The apri vector 154 may include one bit per entry indicating whether the respective tracker entry is actively transferring the DMA payload. Table 1 above provides descriptions for the variables used to describe the operation of the system, including inputs, outputs, and intermediate values used within, e.g., tracker arbitrator 120.

The system selects, from the entries, a winning tracker entry by arbitrating among the entries by performing several operations (indicated by an element 306, which includes operations 308, 310, and 312). A detailed description of tracker arbitrator 120 and the tracker bid mask unit depicted in diagram 200 (including General Trk_Arb_Msk 126 and Soft-Priority Trk_Arb_Msk 130) are provided above in relation to FIGS. 1A, 1B, and 2.

The system determines a current mask indicating entries which are currently excluded from being selected as the winning tracker entry (operation 308). For example, based on pseudocode 232 of element 230 in FIG. 2, the tracker bid mask unit may determine the current mask mskn_q 272 based on the progressively updated mask mskn 270.

The system updates the current mask in cycles in response to detecting a first condition, the first condition comprising remaining tracker entries which require processing, have sufficient available output queue credit for the traffic class ID, and are not currently masked (operation 310). For example, the tracker bid mask unit may use its various inputs (including bid_vld 262, bid_tc 264, current mask mskn_q 272, and upd_* values 280-286) to detect this first condition (as indicated by pseudocode 234 in element 230).

The system identifies the winning tracker entry based on the current mask and the indicators for the entries (operation 312). For example, as described above in relation to FIG. 2, the tracker bid mask unit may produce the masked bid vector bidm 294 based on the current mask mskn_q 272 and the above-described inputs (i.e., the indicators for the entries).

The system forwards information associated with the winning tracker entry in response to meeting a predetermined priority level (operation 314). The system may determine the winning tracker entry based on operations by 50/50 arbitrator 138 on the resulting bidm 168 and bidmp 169 vectors from, respectively, General Trk_Arb_Msk 126 and Soft-Priority Trk_Arb_Msk 130. The system may further determine the winning tracker entry based on operations by the Find_First block 140 and mux 142, as described above in relation to FIG. 1B. Mux 142 may provide, as the final output from tracker arbitrator 120, output 178 which includes the winning tracker entry number and the looked-up instruction corresponding to the winning tracker entry (e.g., via communications 171 and 157 of FIG. 1B). In addition, the predetermined priority level may be enforced based on the operations of NOR 144 and mux 142 in response to inputs from Deallocate_MsgID queue 118, including a Deallocate_MsgID command 159 and indicator 160 miq_empty, as described above in relation to FIG. 1B. The operation returns.

Figure 3B:
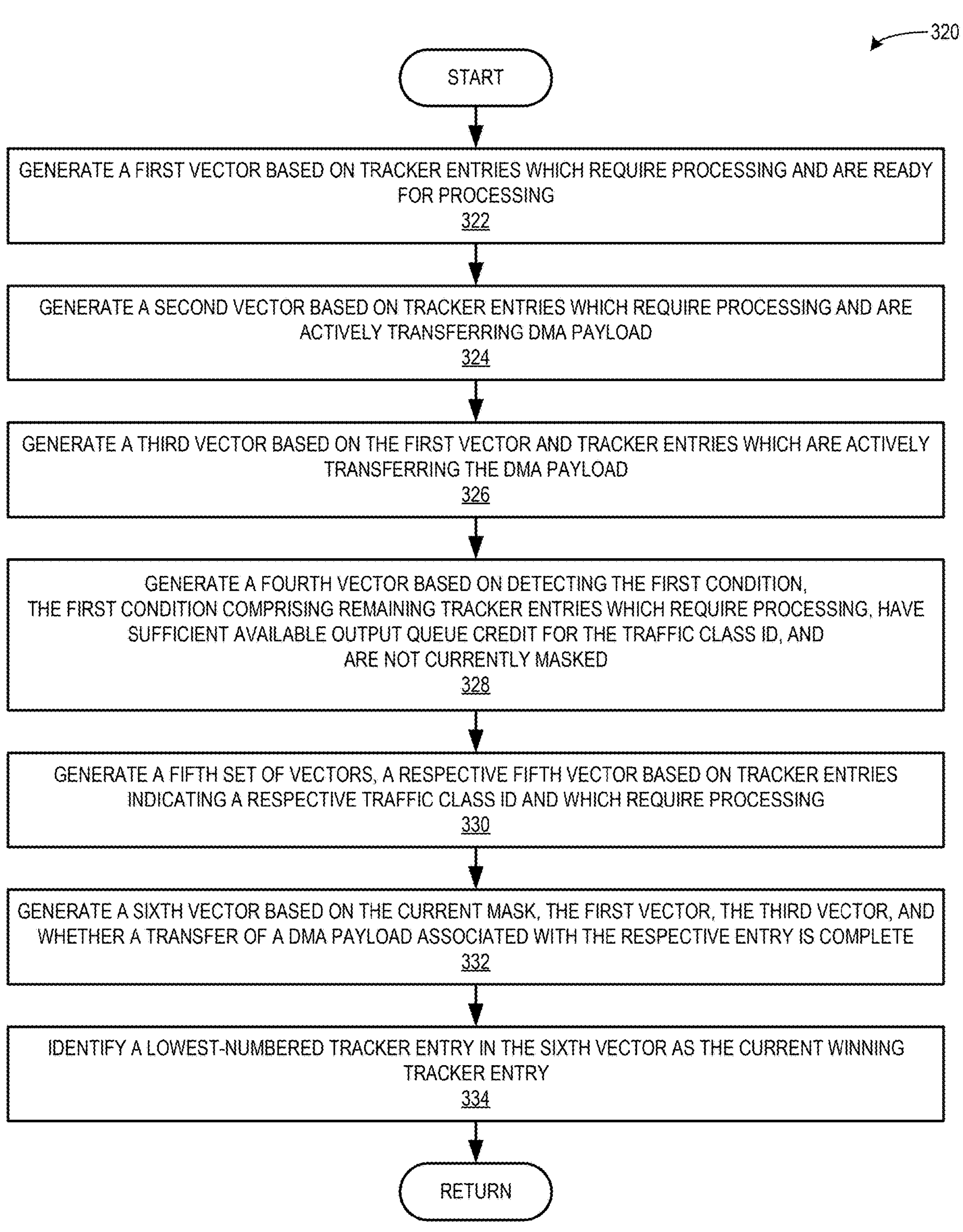
FIG. 3B presents a flowchart illustrating a method which facilitates selecting a winning tracker entry by arbitrating among tracker entries, in accordance with an aspect of the present application.

FIG. 3B presents a flowchart 320 illustrating a method which facilitates selecting a winning tracker entry by arbitrating among tracker entries, in accordance with an aspect of the present application. The system can arbitrate among the entries by performing operations 322-330, and the system can identify the winning tracker entry by performing operations 332 and 334.

The system generates a first vector based on tracker entries which require processing and are ready for processing (operation 322). For example, as described above in relation to FIG. 1B, AND block 124 can produce a bid vector 165 (i.e., "first vector") based on an AND of bid_rdy 162 and bid_vld 152, where bid 165 indicates tracker entries which require processing and have the necessary resources for processing.

The system generates a second vector based on tracker entries which require processing and are actively transferring DMA payload (operation 324). For example, AND block 134 can produce a bid_vldp vector 167 (i.e., "second vector") based on an AND of bid_vld 152 and apri 154, where bid_vldp vector 167 indicates tracker entries which are ready to be processed and are actively processing DMA payload, as described above in relation to FIG. 1B.

The system generates a third vector based on the first vector and tracker entries which are actively transferring the DMA payload (operation 326). For example, as described above in relation to FIG. 1B, AND block 128 can produce a bidp vector 166 (i.e., "third vector") based on an AND of bid 165 and apri 154, where bidp 165 indicates a soft-priority version of tracker entries which require processing, have the necessary resources for processing, and are actively transferring DMA payload The system generates a fourth vector based on detecting the first condition (operation 328). For example, pseudocode 212 of element 210 in FIG. 2 can produce bidvca 266 (i.e., "fourth vector"), which indicates qualified tracker entries which require processing, have sufficient available output queue credit, and are not currently masked (i.e., the "first condition").

The system generates a set of fifth vectors, a respective fifth vector based on tracker entries indicating a respective traffic class ID and which require processing (operation 330). For example, pseudocode 222 of element 220 in FIG. 2 can produce bidvptc 268 (i.e., "set of fifth vectors"), which can be a two-dimensional array of traffic-class-specific vectors, where a respective traffic-class-specific vector indicates tracker entries of the respective traffic class which require processing.

The system identifies the winning tracker entry by generating a sixth vector based on the current mask, the first vector (e.g., bid), the third vector (e.g., bidp), and whether a transfer of a DMA payload associated with the respective entry is complete (operation 332). For example, as indicated by pseudocode 252 in element 250 in FIG. 2, the tracker bid mask unit may produce the masked bid vector based on inputs bid 290, bidc 292, and the current mask mskn_q. The result of pseudocode 252 can be a bidm vector 294 ("sixth vector") which indicates tracker entries which require processing and may be processed and are either: (i) not currently masked; or (ii) in the BIDC state. That is, generating bidm may be based on the current mask mskn_q 272, bid 290 (which may be bid 165 as the "first vector" or bidp 166 as the "third vector," depending on the instance of Trk_Arb_Msk), and bidc 292 (i.e., whether a transfer of a DMA payload associated with the respective entry is complete.

The system further identifies the winning tracker entry by identifying a lowest-numbered tracker entry in the sixth vector as the current winning tracker entry (operation 334). For example, as described above in relation to FIG. 1B, subsequent to 50/50 arbitrator 138 selecting one of the produced masked bid vectors bidm 168 and bidmp 169 (which result is renamed as bidmm 170), Find_First block 140 may perform a priority encode in order to identify the lowest-numbered tracker entry as the current winning tracker entry (i.e., the rightmost tracker entry in bidmm 170). The operation returns.

Figure 4A:
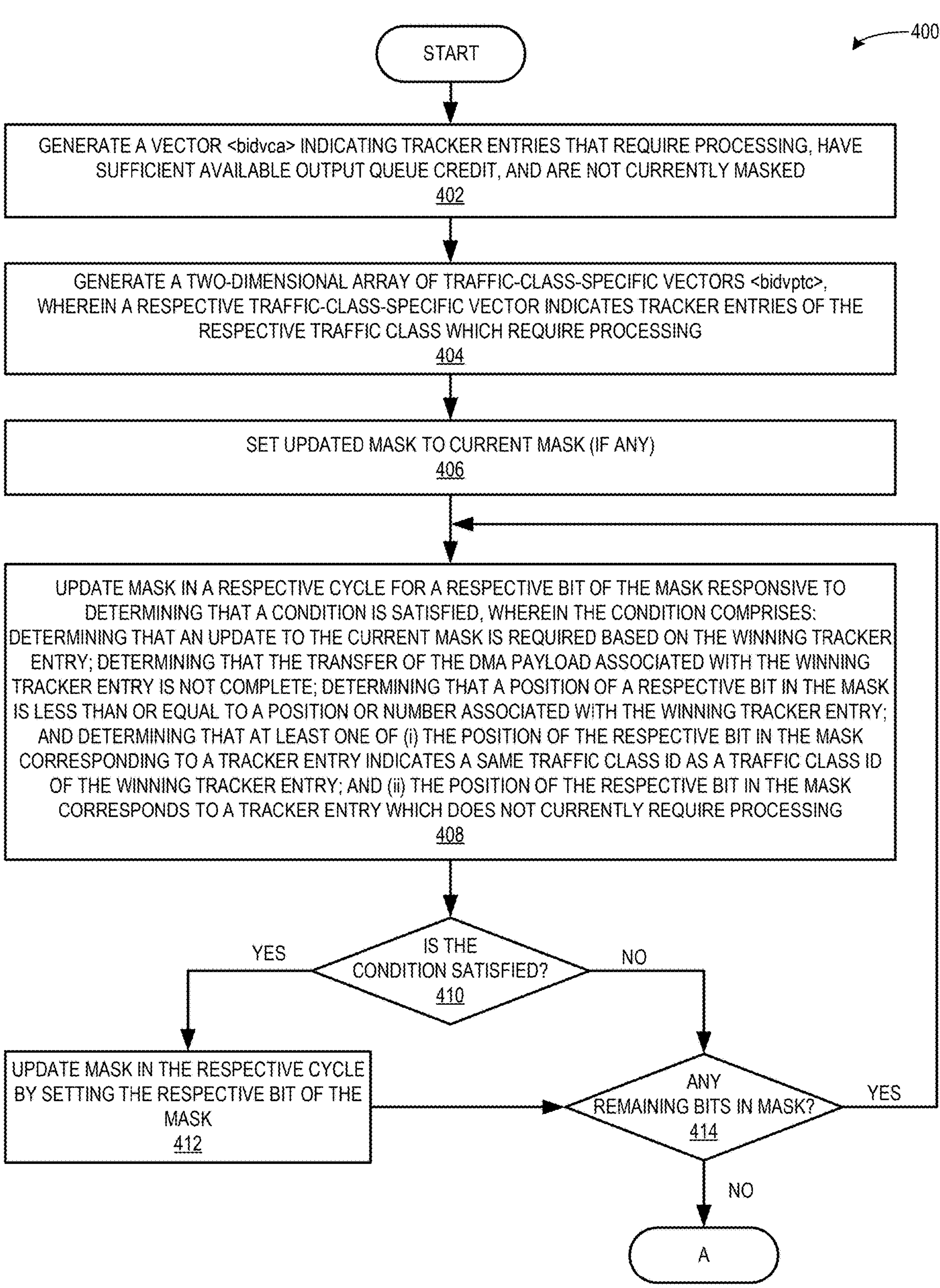
FIG. 4A presents a flowchart illustrating a method which facilitates updating a progressive mask and producing a masked bid vector, in accordance with an aspect of the present application.

FIG. 4A presents a flowchart 400 illustrating a method which facilitates updating a progressive mask and producing a masked bid vector, in accordance with an aspect of the present application. The system generates a vector indicating tracker entries that require processing, have sufficient available output queue credit, and are not currently masked (operation 402). For example, as described above in relation to FIG. 2, pseudocode 212 in element 210 may generate, based on inputs including tr_cr_avail 260 and bid_vld 262, a bidvca vector 266 which indicates tracker entries that require processing, have sufficient available output queue credit, and are currently not masked.

The system generates a two-dimensional array of traffic-class-specific vectors, wherein a respective traffic-class-specific vector indicates tracker entries of the respective traffic class which require processing (operation 404). Pseudocode 222 in element 220 may generate, based on bid_vld 262 and bid_tc 264, a bidvptc vector 268 which is a two-dimensional array of bid valid vectors per traffic class, as described above in relation to FIG. 2

The system sets the updated mask to the current mask (if any) (operation 406). For example, updated mask mskn 270 can be progressively updated and stored in progressive mask register 240, to be used as current mask mskn_q 272 for a next cycle, in which the updated mask mskn is set to the value of the current mask mskn_q, as depicted by pseudocode 232 in element 230.

The system updates the mask in a respective cycle for a respective bit of the mask responsive to determining that a condition is satisfied, wherein the condition comprises: determining that an update to the current mask is required based on the winning tracker entry being selected; determining that the transfer of the DMA payload associated with the winning tracker entry is not complete; determining that a position of a respective bit in the mask is less than or equal to a position or number associated with the winning tracker entry; and determining that at least one of (i) the position of the respective bit in the mask corresponding to a tracker entry indicates a same traffic class ID as a traffic class ID of the winning tracker entry and (ii) the position of the respective bit in the mask corresponds to a tracker entry which does not currently require processing (operation 408). Determining that the condition is satisfied may include using inputs bidvca 266, bid_vld 262, bidvptc 268, bid_tc 264, mskn_q 272, and upd_* values 280-286, as shown in FIG. 2.

If the condition is satisfied (decision 410), the system updates the mask in the respective cycle by setting the respective bit of the mask (operation 412) and determines whether there are any remaining bits in the mask to be processed (decision 414). For example, the system may "mask off" the respective bit by setting the value of the respective bit to a value of "1."

If the condition is not satisfied (decision 410), and if there are remaining bits in the mask to be processed (decision 414), the operation returns to operation 408. If the condition is not satisfied (decision 410) and if there are no remaining bits in the mask to be processed (decision 414), the operation continues at Label A of FIG. 4B.

Figure 4B:
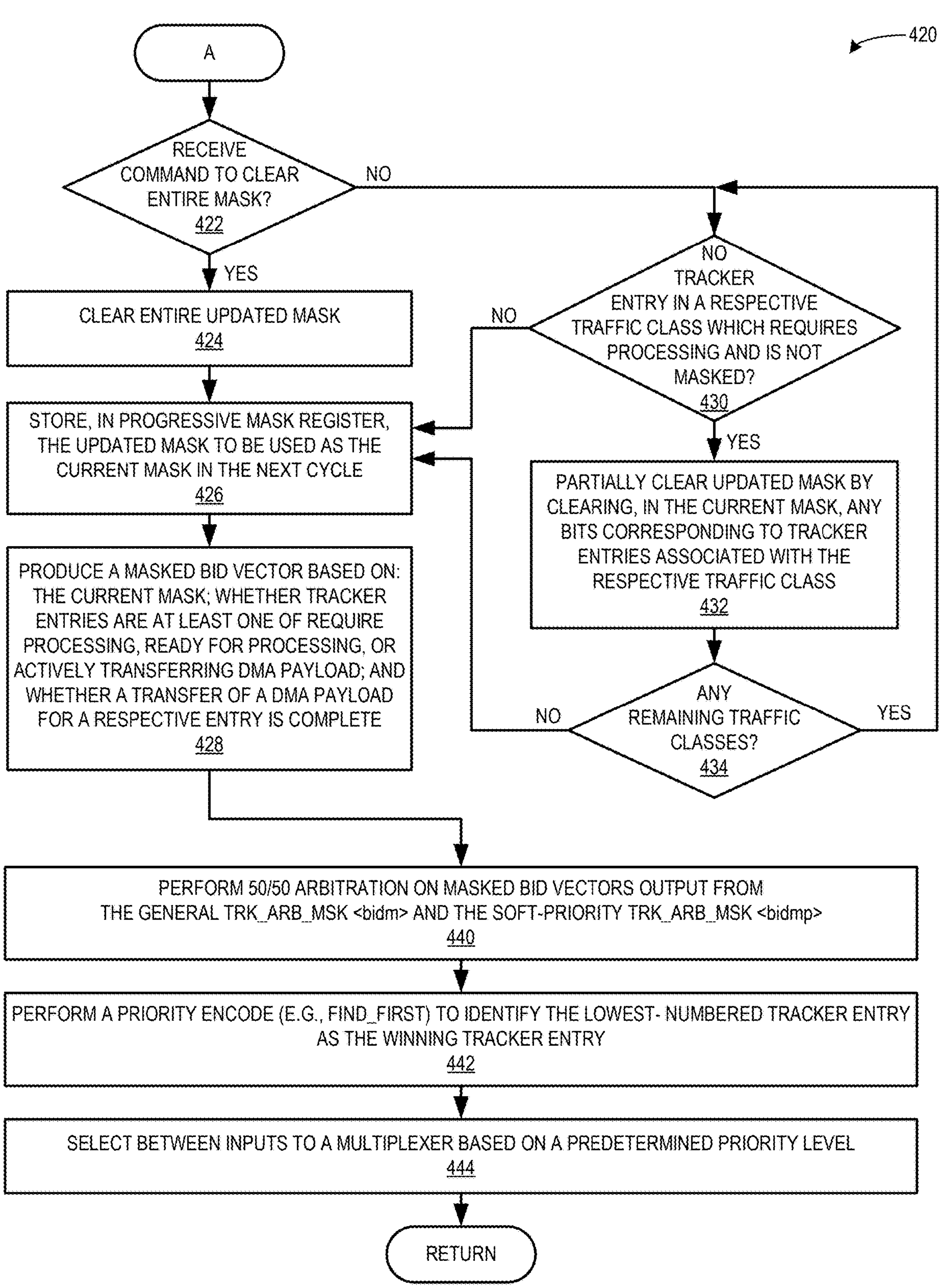
FIG. 4B presents a flowchart illustrating a method which facilitates updating a progressive mask and producing a masked bid vector, in accordance with an aspect of the present application.

FIG. 4B presents a flowchart 420 illustrating a method which facilitates updating a progressive mask and producing a masked bid vector, in accordance with an aspect of the present application. While FIG. 4B depicts decisions 422 and 430 in a certain order, these decisions may also occur in a reverse order, e.g., as indicated by pseudocode 236 and 238 in element 230 of FIG. 2.

If the system receives a command to clear the entire mask (decision 422), the system clears the entire update mask (operation 424). For example, if the instance of Trk_Arb_Msk depicted in FIG. 2 receives a clr_msk signal 288 indicating that the entire mask should be cleared, then pseudocode 238 in element 230 may "clear" the mask by setting the value of each bit in the current mask mskn to a value of zero.

The system stores, in the progressive mask register, the updated mask to be used as the current mask in the next cycle (operation 426), as depicted by a communication of mskn 270 to progressive mask register 240 in FIG. 2. Progressive mask register 240 can store one or more versions of the progressive mask based on a number of cycles of processing.

If the system does not receive a command to clear the entire mask (decision 422), and if there is no tracker entry in a respective traffic class which requires processing and is not masked (decision 430), the system partially clears the updated mask by clearing any bits corresponding to tracker entries associated with the respective traffic class (operation 432). For example, the system may "clear" a bit by setting the respective bit to a value of zero. Thus, the system does not clear any bits corresponding to a tracker entry in a given traffic class which still require processing or which is masked. Instead, the system steps through the traffic classes indicated by bidvptc 268 and, for a given traffic class, only clears the bits in the current mask corresponding to the given traffic class if there are no tracker entries in the given traffic class which require processing and are unmasked, as described above in relation to pseudocode 236 in element 230 of FIG. 2.

If there are any remaining traffic classes to process (decision 434), the operation returns to decision 430. If there are no remaining traffic classes to process (decision 434) the operation continues at operation 426 (i.e., storing the updated mask in the progressive mask register).

If there is not no tracker entry in a respective traffic class which requires processing and is not masked (i.e., if there is a tracker entry in the respective traffic class which requires processing or is masked) (decision 430), the operation continues at operation 426 (i.e., storing the updated mask in the progressive mask register).

Subsequent to operation 426, the system produces a masked bid vector based on: the current mask; whether the tracker entries are at least one of require processing, ready for processing or actively transferring DMA payload; and whether a transfer of a DMA payload for a respective entry is complete (operation 428). For example, pseudocode 252 in element 250 in FIG. 2 can produce a masked bid vector bidm 294 (which can be either bidm or bidmp depending on the instance of the Trk_Arb_Msk).

The system performs a 50/50 arbitration on the masked bid vectors output from the general tracker bid mask unit and the soft-priority tracker bid mask unit (operation 440) to select the masked bid vector to be processed. For example, General Trk_Arb_Msk 126 may generate a bidm vector 168 and Soft-Priority Trk_Arb_Msk 130 may generate a bidmp vector 169. 50/50 arbitrator 138 may perform a 50/50 arbitration on these two masked bid vectors (i.e., bidm and bidmp) by selecting either vector using a half and half ratio, e.g., one half of the time selecting bidm and the other half of the time selecting bidmp. The resulting selected masked bid vector may be referred to as bidmm (e.g., bidmm 170 in FIG. 1B).

The system performs a priority encode on the selected masked bid vector (e.g., a Find_First) to identify the lowest-numbered tracker entry with a "1" in the corresponding bit of the masked bid vector as the winning tracker entry (operation 442). For example, Find_First block 140 may identify the rightmost or lowest-numbered tracker entry with a "1" in the corresponding bit of the masked bid vector as the winning tracker entry, resulting in inputs 171 and 157 to mux 142 in FIG. 1B.

The system selects between inputs to a multiplexer based on a predetermined priority level (operation 444). For example, in FIG. 1B, mux 142 may receive as input a selected tracker entry 171 based on operations performed on vectors bidm 168 and bidmp 169 (as described below in relation to FIG. 1B) as well as information associated with the winning or selected tracker entry via entry_lookup 156/157. Mux 142 may also receive as input information associated with a command to deallocate resources associated with a MsgID (e.g., a command 159 or an indicator 160 of whether Deallocate_MsgID queue 118 is empty). Based on the operations of NOR 144 and mux 142 described above in relation to FIG. 1B, mux 142 may select an input based on a predetermined priority level, e.g.: tracker entries which have already completed DMA payload transfer have the highest priority for being processed and forwarded; a Deallocate MsgID command has the next highest priority for processing; and all other tracker entries have the lowest priority for being processed and forwarded. The operation returns.

Figure 5:
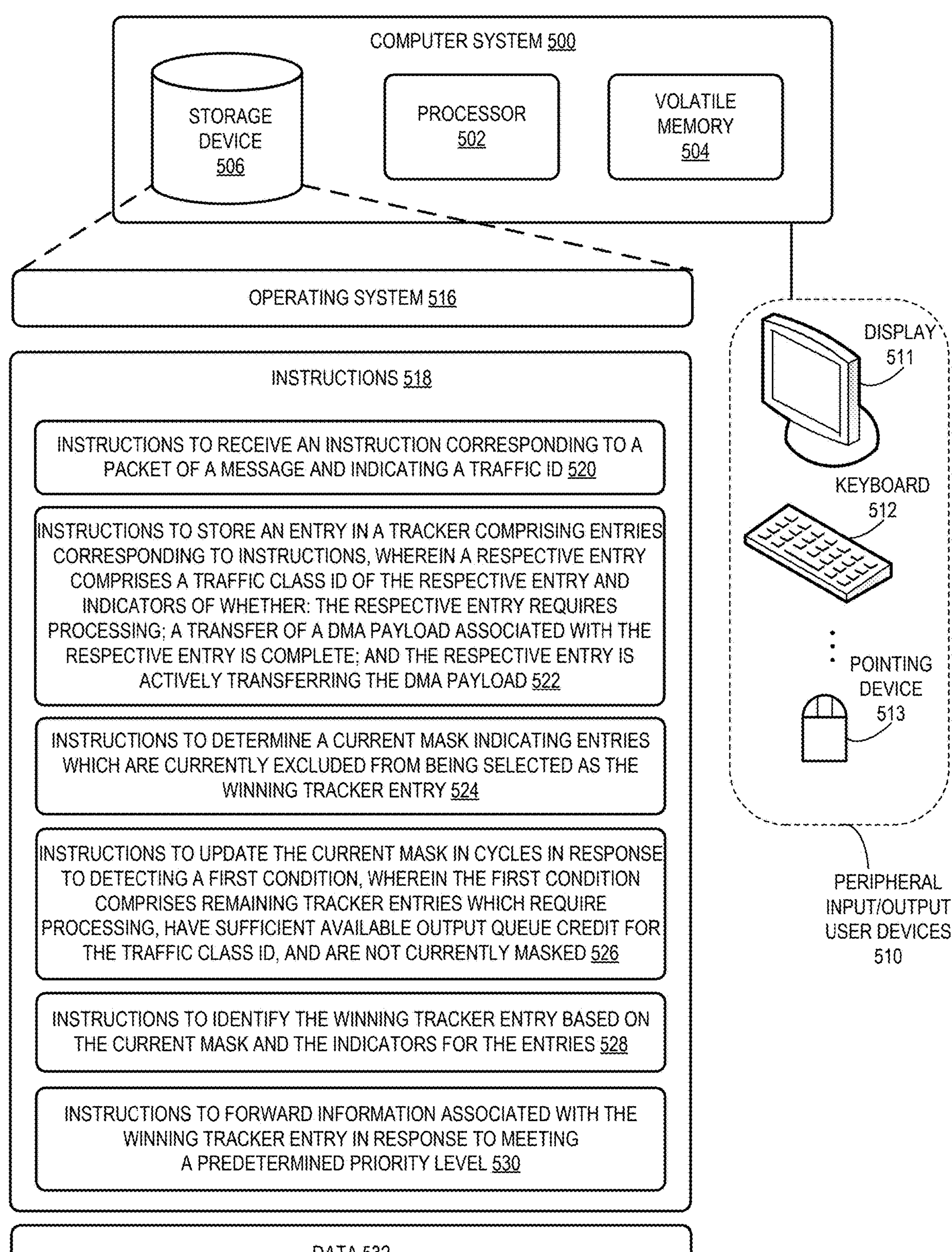
FIG. 5 illustrates a computer system which facilitates multi-traffic-class tracker arbitration with focus and prioritized deallocation, in accordance with an aspect of the present application.

FIG. 5 illustrates a computer system 500 which facilitates multi-traffic-class tracker arbitration with focus and prioritized deallocation, in accordance with an aspect of the present application. Computer system 500 includes a processor 502, a memory 504, and a storage device 506. Memory 504 may include a volatile memory (e.g., random access memory (RAM)) that serves as a managed memory and can be used to store one or more memory pools. Furthermore, computer system 500 may be coupled to peripheral I/O user devices 510 (e.g., a display device 511, a keyboard 512, and a pointing device 513). Storage device 506 includes non-transitory computer-readable storage medium and stores an operating system 516, instructions 518, and data 530. Computer system 500 may be a network device 500 with at least one processing resource (e.g., 502) and circuitry (including modules, units, components, etc. in hardware, software, or a combination of hardware and software, e.g., 506) to perform the methods, operations, computations, determinations, and functions described herein. In network device 500, the circuitry or storage device may store instructions which when executed by the at least one processing resource (e.g., 502) comprises instructions to perform the operations described herein. Computer system 500 may include fewer or more entities or instructions than those shown in FIG. 5.

Instructions 518 can include instructions, which when executed by computer system 500, can cause computer system 500 to perform methods and/or processes described in this disclosure. Specifically, instructions 518 may include instructions 520 to receive an instruction corresponding to a packet of a message and indicating a traffic class identifier (ID), as described above in relation to instruction 150 of FIGS. 1A and 1B and operation 302 of FIG. 3A Instructions 518 may also include instructions 522 to store an entry for the instruction in a tracker data structure comprising entries corresponding to instructions, wherein a respective entry comprises a traffic class ID of the respective entries and indicators of whether the respective entry requires processing, whether a transfer of a DMA payload associated with the respective entry is complete, and whether the respective entry is actively transferring the DMA payload, as described above in relation to tracker arbitrator 120 of FIGS. 1A and 1B, the tracker bid mask unit in diagram 200 of FIG. 2, and operation 304 of FIG. 3A.

Instructions 518 may also include instructions to select, from the entries, a winning tracker entry by arbitrating among the entries, based on instructions 524, 526, and 528. Instructions 518 may include instructions 524 to determine a current mask indicating entries which are currently excluded from being selected as the winning tracker entry, as described above in relation to the produced vectors bidvca 266 and bidvptc 268, progressive mask update element 230 and pseudocode 232-238, and pseudocode 252 in element 250 in FIG. 2 as well as in relation to operation 308 of FIG. 3A.

Instructions 518 may include instructions 526 to update the current mask in cycles in response to detecting a first condition, wherein the first condition comprises remaining tracker entries which require processing, have sufficient available output queue credit for the traffic class ID, and are not currently masked, as described above in relation to elements 210, 220, 230, and 250 in FIG. 2. Updating the current mask in cycles is described in detail above in relation to operation 310 of FIG. 3A.

Instructions 518 may also include instructions 528 to identify the winning tracker entry based on the current mask and the indicators for the entries, as described above in relation to the operations prior to pseudocode 252 in element 250 of FIG. 2 as well as operation 312 in FIG. 2.

Instructions 518 may further include instructions 530 to forward information associated with the winning tracker entry in response to meeting a predetermined priority level, as described above in relation to NOR 144, mux 142, and output 178 in FIGS. 1A and 1B as well as operation 314 of FIG. 3A Instructions 518 may include more instructions than those shown in FIG. 5. For example, instructions 518 may include instructions for executing the operations described above in relation to: the variables, inputs, outputs, results, communications, pseudocode, and modules/units in FIGS. 1A, 1B, and 2; the operations of the flowcharts in FIGS. 3A, 3B, 4A, and 4B; and CRM 600 of FIG. 6.

Data 530 can include any data that is required as input or that is generated as output by the methods, operations, communications, and/or processes described in this disclosure. Specifically, data 530 can store at least: a message; an instruction; a message ID; a traffic class ID; an entry; a tracker entry; a tracker data structure; a vector; a bit vector; a two-dimensional array of vectors or bit vectors per traffic class; an indicator; an indicator of whether a respective entry requires processing; an indicator of whether a transfer of a DMA payload associated with a respective entry is complete; an indicator of whether a respective entry is actively transferring the DMA payload; a winning tracker entry; a current mask; an updated mask; an indicator of entries excluded from being selected as the winning tracker entry; an indicator of sufficient or available output queue credit; an indicator of sufficient or available pipeline queue credit; an indicator of whether a respective entry is currently masked; a vector based on one or more indicators; a lowest-numbered tracker entry; a signal to clear an entire mask; a determination of how to partially clear a mask; an indicator of whether a mask needs to be updated; an indicator of the winning tracker entry in the current cycle; an indicator of the traffic class ID of the winning tracker entry; and an indicator of a state of the winning tracker entry.

FIG. 6 illustrates a computer-readable medium (CRM) 600 which facilitates multi-traffic-class tracker arbitration with focus and prioritized deallocation, in accordance with an aspect of the present application. CRM 600 can be a non-transitory computer-readable medium or device storing instructions that when executed by a computer or processor cause the computer or processor to perform a method, including the methods and operations described herein.

CRM 600 may store instructions 610 to receive an instruction corresponding to a packet of a message and indicating a traffic class identifier (ID), as described above in relation to instruction 150 of FIGS. 1A and 1B and operation 302 of FIG. 3A.

CRM 600 may also store instructions 620 to store an entry for the instruction in a tracker data structure comprising entries corresponding to instructions, wherein a respective entry comprises a traffic class ID of the respective entry and indicators of whether the respective entry requires processing, whether a transfer of a DMA payload associated with the respective entry is complete, and whether the respective entry is actively transferring the DMA payload, as described above in relation to tracker arbitrator 120 of FIGS. 1A and 1B, the tracker bid mask unit in diagram 200 of FIG. 2, and operation 304 of FIG. 3A.

CRM 600 may further store instructions 630 to select, from the entries, a winning tracker entry by arbitrating among the entries, as described above in relation to element 306 of FIG. 3A.

Instructions 630 may include instructions 632 to determine a current mask indicating entries which are currently excluded from being selected as the winning tracker entry, as described above in relation to the produced vectors bidvca 266 and bidvptc 268, progressive mask update element 230 and pseudocode 232-238, and pseudocode 252 in element 250 in FIG. 2 as well as in relation to operation 308 of FIG. 3A.

Instructions 630 may include instructions 634 to update the current mask in cycles in response to detecting a first condition, the first condition comprising remaining tracker entries which require processing, have sufficient available output queue credit for the traffic class ID, and are not currently masked, as described above in relation to elements 210, 220, 230, and 250 in FIG. 2. Updating the current mask in cycles is described in detail above in relation to operation 310 of FIG. 3A.

Instructions 630 may also include instructions 636 to identify the winning tracker entry based on the current mask and the indicators for the entries, as described above in relation to the operations prior to pseudocode 252 in element 250 of FIG. 2 as well as operation 312 in FIG. 2.

CRM 600 may further store instructions 640 to forward information associated with the winning tracker entry in response to meeting a predetermined priority level, as described above in relation to NOR 144, mux 142, and output 178 in FIGS. 1A and 1B as well as operation 314 of FIG. 3A.

CRM 600 may include more instructions than those shown in FIG. 6. For example, CRM 600 may also store instructions to execute the operations described above in relation to: the variables, inputs, outputs, results, communications, pseudocode, and modules/units in FIGS. 1A, 1B, and 2; the operations of the flowcharts in FIGS. 3A, 3B, 4A, and 4B; and the computer system (or network device) of FIG. 5.

In general, the disclosed aspects provide a method, network device, and non-transitory computer-readable storage medium which facilitates multi-traffic-class tracker arbitration with focus and prioritized deallocation. In one aspect, the system receives, by a direct memory access (DMA) engine, an instruction corresponding to a packet of a message and indicating a traffic class identifier (ID). The system stores an entry for the instruction in a tracker data structure comprising entries corresponding to instructions, a respective entry comprising a traffic class ID of the respective entry and indicators of whether the respective entry requires processing, whether a transfer of a DMA payload associated with the respective entry is complete, and whether the respective entry is actively transferring the DMA payload. The system selects, from the entries, a winning tracker entry by arbitrating among the entries, which comprises: determining a current mask indicating entries which are currently excluded from being selected as the winning tracker entry; updating the current mask in cycles in response to detecting a first condition, the first condition comprising remaining tracker entries which require processing, have sufficient available output queue credit for the traffic class ID, and are not currently masked; and identifying the winning tracker entry based on the current mask and the indicators for the entries. The system forwards information associated with the winning tracker entry in response to meeting a predetermined priority level.

In a variation on this aspect, the system arbitrates among the entries by performing at least the following operations. The system generates a first vector (e.g., bid 165) based on tracker entries which require processing and are ready for processing. The system generates a second vector (e.g., bid_vldp 167) based on tracker entries which require processing and are actively transferring DMA payload. The system generates a third vector (e.g., bidp 166) based on the first vector and tracker entries which are actively transferring the DMA payload. The system generates a fourth vector (e.g., bidvca 266) based on detecting the first condition. The system generates a set of fifth vectors (e.g. bidvptc 268), a respective fifth vector based on tracker entries indicating a respective traffic class ID and which require processing.

In a further variation on this aspect, the system identifies the winning tracker entry by performing at least the following operations. The system generates a sixth vector (e.g., bidm) based on the current mask, the first vector, the third vector, and whether a transfer of a DMA payload associated with the respective entry is complete. The system identifies a lowest-numbered tracker entry in the sixth vector as the current winning tracker entry.

In a further variation, the system updates the current mask in a respective cycle for each bit of the mask by perform at least the following operations. The system determines that an update to the current mask is required based on the winning tracker entry being selected. The system determines that the transfer of the DMA payload associated with the winning tracker entry is not complete. The system determines that a position of a respective bit in the mask is less than or equal to a position or number associated with the winning tracker entry. The system determines that at least one of: the position of the respective bit in the mask corresponding to a tracker entry indicates a same traffic class ID as a traffic class ID of the winning tracker entry; or the position of the respective bit in the mask corresponds to a tracker entry which does not currently require processing.

In a further variation, the system updates the current mask in a respective cycle for each bit of the mask, which comprises clearing the current mask by clearing an entirety of the current mask in response to receiving a command from an external component to clear the current mask.

In a further variation, the system updates the current mask in a respective cycle for each bit of the mask by performing, for each traffic class, a partial clearing of the current mask by: determining no tracker entry associated with a respective traffic class requires processing and is not masked; and clearing, in the current mask, any bits corresponding to tracker entries associated with the respective traffic class.

In a further variation, the system updates the current mask in a respective cycle for each bit of the mask based on at least one of: whether the mask needs to be updated; the winning tracker entry in the current cycle; the traffic class ID of the winning tracker entry; or a state of the winning tracker entry.

In a further variation, the received instruction further indicates a message identifier (ID). The respective entry in the tracker data structure further comprises an indicator of whether the respective entry is marked for deallocation. The system receives a command to deallocate resources associated with a first message ID. The system deallocates the resources associated with the first message ID by: responsive to identifying any active tracker entries with an instruction containing the first message ID, marking a state of a respective active tracker entry as deallocated without caching any context; removing from a cache any context associated with the message ID; and freeing resources associated with the message ID.

In a further variation, the system maintains a plurality of output queues, a respective output queue corresponding to a respective traffic class ID, and the respective output queue associated with an output queue credit. The system refrains from placing a packet associated with the instruction indicating the traffic class ID into a corresponding output queue in response to not having sufficient output queue credit for the corresponding output queue.

In a further variation, prior to forwarding the information associated with the winning tracker entry, the system selecting between inputs to a multiplexer based on the predetermined priority level, by performing the following operations. The system selects, at a first priority level, a tracker entry for which the DMA payload transfer is complete. The system selects, at a second priority level, a command to deallocate a message ID. The system selects, at a third priority level, all other tracker entries selected based on the arbitrating. The first priority level is higher than the second priority level, and the second priority level is higher than the third priority level. For the other tracker entries at the third priority level, tracker entries actively transferring DMA payload are selected more frequently than a remainder of the other tracker entries at the third priority level.

In a further variation, the forwarded information associated with the winning tracker entry comprises: a number corresponding to the winning tracker entry; and an instruction obtained from a lookup in the tracker data structure for the winning tracker entry.

Another aspect provides a computer system or a network device comprising at least one processing resource and a storage device (e.g., circuitry) storing instructions which when executed by the at least one processing resource comprises instructions to receive an instruction corresponding to a packet of a message and indicating a traffic class identifier (ID). The instructions are further to store an entry for the instruction in a tracker data structure comprising entries corresponding to instructions, wherein a respective entry comprises a traffic class ID of the respective entries and indicators of whether the respective entry requires processing, whether a transfer of a DMA payload associated with the respective entry is complete, and whether the respective entry is actively transferring the DMA payload. The instructions are further to select, from the entries, a winning tracker entry by arbitrating among the entries, which comprises: determining a current mask indicating entries which are currently excluded from being selected as the winning tracker entry; updating the current mask in cycles in response to detecting a first condition, wherein the first condition comprises remaining tracker entries which require processing, have sufficient available output queue credit for the traffic class ID, and are not currently masked; and identifying the winning tracker entry based on the current mask and the indicators for the entries. The instructions are further to forward information associated with the winning tracker entry in response to meeting a predetermined priority level.

In a variation on this aspect, the instructions to identify the winning tracker entry are further to generate a vector based on the current mask, tracker entries which require processing and are ready for processing, tracker entries which require processing and are actively transferring DMA payload, and whether a transfer of a DMA payload associated with the respective entry is complete. The instructions are further to identify a lowest-numbered tracker entry in the vector as the current winning tracker entry.

The computer system or network device may include a content-processing system which includes the above-described instructions and instructions to perform the operations described herein, including in relation to: the variables, inputs, outputs, results, communications, pseudocode, and modules/units in FIGS. 1A, 1B, and 2; the operations of the flowcharts in FIGS. 3A, 3B, 4A, and 4B; and CRM 600 of FIG. 6.

Yet another aspect provides a non-transitory computer-readable storage medium (CRM) storing instructions that when executed by a computer cause the computer to receive an instruction corresponding to a packet of a message and indicating a traffic class identifier (ID). The instructions are further to store an entry for the instruction in a tracker data structure comprising entries corresponding to instructions, wherein a respective entry comprises a traffic class ID of the respective entry and indicators of whether the respective entry requires processing, whether a transfer of a DMA payload associated with the respective entry is complete, and whether the respective entry is actively transferring the DMA payload. The instructions are further to select, from the entries, a winning tracker entry by arbitrating among the entries, which comprises: determining a current mask indicating entries which are currently excluded from being selected as the winning tracker entry; updating the current mask in cycles in response to detecting a first condition, the first condition comprising remaining tracker entries which require processing, have sufficient available output queue credit for the traffic class ID, and are not currently masked; and identifying the winning tracker entry based on the current mask and the indicators for the entries. The instructions are further to forward information associated with the winning tracker entry in response to meeting a predetermined priority level.

The CRM can also store instructions for executing the operations described above in relation to: the variables, inputs, outputs, results, communications, pseudocode, and modules/units in FIGS. 1A, 1B, and 2; the operations of the flowcharts in FIGS. 3A, 3B, 4A, and 4B; and the computer system (network device) of FIG. 5.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:

receiving, by a direct memory access (DMA) engine, an instruction corresponding to a packet of a message and indicating a traffic class identifier (ID);

storing an entry for the instruction in a tracker data structure comprising entries corresponding to instructions, a respective entry comprising a traffic class ID of the respective entry and indicators of whether the respective entry requires processing, whether a transfer of a DMA payload associated with the respective entry is complete, and whether the respective entry is actively transferring the DMA payload;

selecting, from the entries, a winning tracker entry by arbitrating among the entries, which comprises:

determining a current mask indicating entries which are currently excluded from being selected as the winning tracker entry;

updating the current mask in cycles in response to detecting a first condition, the first condition comprising remaining tracker entries which require processing, have sufficient available output queue credit for the traffic class ID, and are not currently masked; and identifying the winning tracker entry based on the current mask and the indicators for the entries; and forwarding information associated with the winning tracker entry in response to meeting a predetermined priority level.

2. The method of claim 1, wherein arbitrating among the entries further comprises:

generating a first vector based on tracker entries which require processing and are ready for processing;

generating a second vector based on tracker entries which require processing and are actively transferring DMA payload;

generating a third vector based on the first vector and tracker entries which are actively transferring the DMA payload;

generating a fourth vector based on detecting the first condition; and generating a set of fifth vectors, a respective fifth vector based on tracker entries indicating a respective traffic class ID and which require processing.

3. The method of claim 2, wherein identifying the winning tracker entry comprises:

generating a sixth vector based on the current mask, the first vector, the third vector, and whether a transfer of a DMA payload associated with the respective entry is complete; and identifying a lowest-numbered tracker entry in the sixth vector as the current winning tracker entry.

4. The method of claim 1, wherein updating the current mask in a respective cycle for each bit of the mask comprises:

determining that an update to the current mask is required based on the winning tracker entry being selected;

determining that the transfer of the DMA payload associated with the winning tracker entry is not complete;

determining that a position of a respective bit in the mask is less than or equal to a position or number associated with the winning tracker entry; and determining that at least one of:

the position of the respective bit in the mask corresponding to a tracker entry indicates a same traffic class ID as a traffic class ID of the winning tracker entry; or the position of the respective bit in the mask corresponds to a tracker entry which does not currently require processing.

5. The method of claim 1, wherein updating the current mask in a respective cycle for each bit of the mask further comprises:

clearing the current mask by clearing an entirety of the current mask in response to receiving a command from an external component to clear the current mask.

6. The method of claim 1, wherein updating the current mask in a respective cycle for each bit of the mask further comprises:

performing, for each traffic class, a partial clearing of the current mask by:

determining no tracker entry associated with a respective traffic class requires processing and is not masked; and clearing, in the current mask, any bits corresponding to tracker entries associated with the respective traffic class.

7. The method of claim 1, wherein updating the current mask in a respective cycle for each bit of the mask is based on at least one of:

whether the mask needs to be updated;

the winning tracker entry in the current cycle;

the traffic class ID of the winning tracker entry; or a state of the winning tracker entry.

8. The method of claim 1, wherein the received instruction further indicates a message identifier (ID);

wherein the respective entry in the tracker data structure further comprises an indicator of whether the respective entry is marked for deallocation; and wherein the method further comprises:

receiving a command to deallocate resources associated with a first message ID; and deallocating the resources associated with the first message ID by:

responsive to identifying any active tracker entries with an instruction containing the first message ID, marking a state of a respective active tracker entry as deallocated without caching any context;

removing from a cache any context associated with the message ID; and freeing resources associated with the message ID.

9. The method of claim 1, further comprising:

maintaining a plurality of output queues, a respective output queue corresponding to a respective traffic class ID, and the respective output queue associated with an output queue credit; and refraining from placing a packet associated with the instruction indicating the traffic class ID into a corresponding output queue in response to not having sufficient output queue credit for the corresponding output queue.

10. The method of claim 1, wherein prior to forwarding the information associated with the winning tracker entry, the method further comprises:

selecting between inputs to a multiplexer based on the predetermined priority level, by:

selecting, at a first priority level, a tracker entry for which the DMA payload transfer is complete;

selecting, at a second priority level, a command to deallocate a message ID; and selecting, at a third priority level, all other tracker entries selected based on the arbitrating, wherein the first priority level is higher than the second priority level, and wherein the second priority level is higher than the third priority level, and wherein, for the other tracker entries at the third priority level, tracker entries actively transferring DMA payload are selected more frequently than a remainder of the other tracker entries at the third priority level.

11. The method of claim 1, wherein the forwarded information associated with the winning tracker entry comprises:

a number corresponding to the winning tracker entry; and an instruction obtained from a lookup in the tracker data structure for the winning tracker entry.

12. A network device, comprising:

at least one processing resource; and a storage device storing instructions which when executed by the at least one processing resource comprise instructions to:

receive an instruction corresponding to a packet of a message and indicating a traffic class identifier (ID);

store an entry for the instruction in a tracker data structure comprising entries corresponding to instructions, wherein a respective entry comprises a traffic class ID of the respective entries and indicators of whether the respective entry requires processing, whether a transfer of a DMA payload associated with the respective entry is complete, and whether the respective entry is actively transferring the DMA payload;

select, from the entries, a winning tracker entry by arbitrating among the entries, which comprises:

determining a current mask indicating entries which are currently excluded from being selected as the winning tracker entry;

updating the current mask in cycles in response to detecting a first condition, wherein the first condition comprises remaining tracker entries which require processing, have sufficient available output queue credit for the traffic class ID, and are not currently masked; and identifying the winning tracker entry based on the current mask and the indicators for the entries; and forward information associated with the winning tracker entry in response to meeting a predetermined priority level.

13. The network device of claim 12, wherein identifying the winning tracker entry comprises:

generating a vector based on the current mask, tracker entries which require processing and are ready for processing, tracker entries which require processing and are actively transferring DMA payload, and whether a transfer of a DMA payload associated with the respective entry is complete; and identifying a lowest-numbered tracker entry in the vector as the current winning tracker entry.

14. The network device of claim 12, wherein updating the current mask in a respective cycle for each bit of the mask comprises:

determining that an update to the current mask is required based on the winning tracker entry being selected;

determining that the transfer of the DMA payload associated with the winning tracker entry is not complete;

determining that a position of a respective bit in the mask is less than or equal to a position or number associated with the winning tracker entry; and determining that at least one of:

the position of the respective bit in the mask corresponding to a tracker entry indicates a same traffic class ID as a traffic class ID of the winning tracker entry; or the position of the respective bit in the mask corresponds to a tracker entry which does not currently require processing.

15. The network device of claim 12, wherein updating the current mask in a respective cycle for each bit of the mask further comprises:

performing, for each traffic class, a partial clearing of the current mask by:

determining no tracker entry associated with a respective traffic class requires processing and is not masked; and clearing, in the current mask, any bits corresponding to tracker entries associated with the respective traffic class.

16. The network device of claim 12, wherein the received instruction further indicates a message identifier (ID);

wherein the respective entry in the tracker data structure further comprises an indicator of whether the respective entry is marked for deallocation; and wherein the instructions are further to:

receive a command to deallocate resources associated with a first message ID; and deallocate the resources associated with the first message ID by:

responsive to identifying any active tracker entries with an instruction containing the first message ID, marking a state of a respective active tracker entry as deallocated without caching any context;

removing from a cache any context associated with the message ID; and freeing resources associated with the message ID.

17. The network device of claim 12, wherein prior to forwarding the information associated with the winning tracker entry, wherein the instructions are further to:

select between inputs to a multiplexer based on the predetermined priority level, by:

selecting, at a first priority level, a tracker entry for which the DMA payload transfer is complete;

selecting, at a second priority level, a command to deallocate a message ID; and selecting, at a third priority level, all other tracker entries selected based on the arbitrating, wherein the first priority level is higher than the second priority level, and the second priority level is higher than the third priority level, and wherein, for the other tracker entries at the third priority level, tracker entries actively transferring DMA payload are selected more frequently than a remainder of the other tracker entries at the third priority level.

18. A non-transitory computer-readable medium storing instructions to:

at least one processing resource; and a storage device storing instructions which when executed by the at least one processing resource comprise instructions to:

receive an instruction corresponding to a packet of a message and indicating a traffic class identifier (ID);

store an entry for the instruction in a tracker data structure comprising entries corresponding to instructions, wherein a respective entry comprises a traffic class ID of the respective entry and indicators of whether the respective entry requires processing, whether a transfer of a DMA payload associated with the respective entry is complete, and whether the respective entry is actively transferring the DMA payload;

select, from the entries, a winning tracker entry by arbitrating among the entries, which comprises:

determining a current mask indicating entries which are currently excluded from being selected as the winning tracker entry;

updating the current mask in cycles in response to detecting a first condition, the first condition comprising remaining tracker entries which require processing, have sufficient available output queue credit for the traffic class ID, and are not currently masked; and identifying the winning tracker entry based on the current mask and the indicators for the entries; and forward information associated with the winning tracker entry in response to meeting a predetermined priority level.

19. The non-transitory computer-readable medium of claim 18, wherein identifying the winning tracker entry comprises:

generating a vector based on the current mask, tracker entries which require processing and are ready for processing, tracker entries which require processing and are actively transferring DMA payload, and whether a transfer of a DMA payload associated with the respective entry is complete; and identifying a lowest-numbered tracker entry in the vector as the current winning tracker entry.

20. The non-transitory computer-readable medium of claim 18, wherein updating the current mask in a respective cycle for each bit of the mask further comprises:

performing, for each traffic class, a partial clearing of the current mask by:

determining no tracker entry associated with a respective traffic class requires processing and is not masked; and clearing, in the current mask, any bits corresponding to tracker entries associated with the respective traffic class.

* * * * *